(12) United States Patent
Yasui et al.

(10) Patent No.: US 7,120,530 B2
(45) Date of Patent: *Oct. 10, 2006

(54) CONTROL APPARATUS OF CONTACT MECHANISM

(75) Inventors: Yuji Yasui, Wako (JP); Kanako Shimojo, Wako (JP); Eijiro Shimabukuro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 321 days.

This patent is subject to a terminal disclaimer.

(21) Appl. No.: 10/743,407

(22) Filed: Dec. 23, 2003

(65) Prior Publication Data
US 2004/0138801 A1 Jul. 15, 2004

(30) Foreign Application Priority Data
Dec. 26, 2002 (JP) ............................ 2002-378413

(51) Int. Cl.
*G06F 7/00* (2006.01)
(52) U.S. Cl. ........................... 701/51; 701/29; 477/34; 318/135
(58) Field of Classification Search ................ 701/51, 701/29; 477/34; 318/135; 385/25; 192/85 CA, 192/112, 115, 91 A; 188/267, 379; 310/322, 310/323.03
See application file for complete search history.

(56) References Cited

U.S. PATENT DOCUMENTS

| 6,487,337 | B1* | 11/2002 | Yamanaka et al. ............ 385/25 |
| 6,505,718 | B1* | 1/2003 | Fujita et al. ................. 188/267 |
| 6,571,135 | B1* | 5/2003 | Bergold et al. ............... 700/42 |
| 6,719,115 | B1* | 4/2004 | Rogner et al. .......... 192/85 CA |
| 6,810,768 | B1* | 11/2004 | Comfort et al. .............. 74/582 |
| 2004/0145321 | A1* | 7/2004 | Yasui et al. ................. 318/135 |
| 2005/0234625 | A1* | 10/2005 | Shimojo et al. .............. 701/51 |

FOREIGN PATENT DOCUMENTS

JP 2002-195406 7/2002

* cited by examiner

Primary Examiner—Gertrude A. Jeanglaude
(74) Attorney, Agent, or Firm—Arent Fox PLLC

(57) ABSTRACT

A low cost control apparatus of a contact mechanism resolving a disadvantage caused when a contact body is moved to make contact with a contacted body by an actuator. A synchronizing mechanism, which a coupling sleeve rotatably and integrally provided with an input shaft is pushed against a synchronizer ring disposed between the coupling sleeve and a synchronized gear, thereby synchronizing rotational speeds of both the components to engage them, is modeled as a collision between an inertia system object and an elastic system object. A computation coefficient (VPOLE, f in FIG. 9) of a switching function for sliding mode control having a deviation between an actual position of the coupling sleeve (Psc, d in FIG. 9) and a target position (Psc_cmd, e in FIG. 9) as a state variable is changed depending on the actual position (Psc), and thereby changing a control ability of the model against a disturbance.

15 Claims, 15 Drawing Sheets a : VPOLE = -1
b : VPOLE = -0.8
c : VPOLE = -0.5

FIG. 9
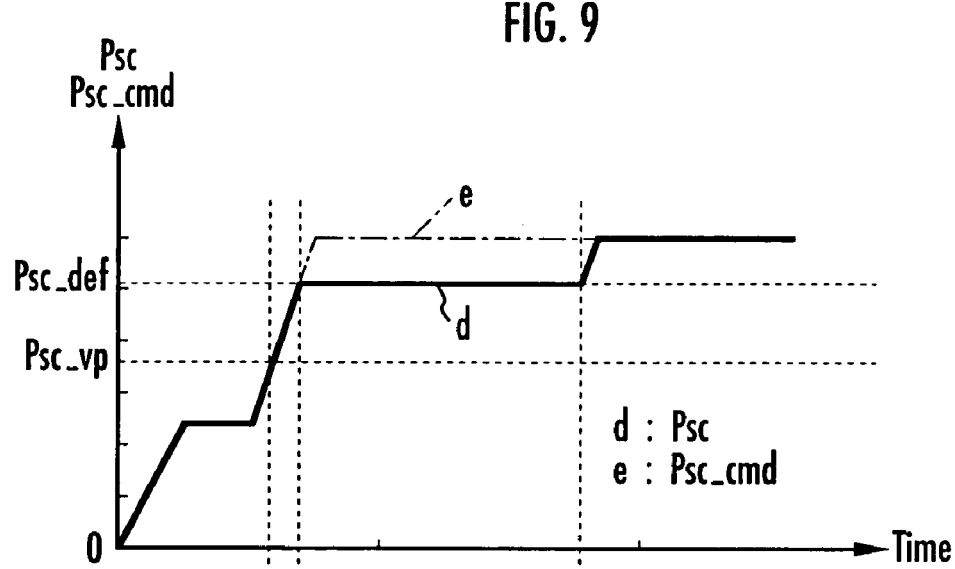
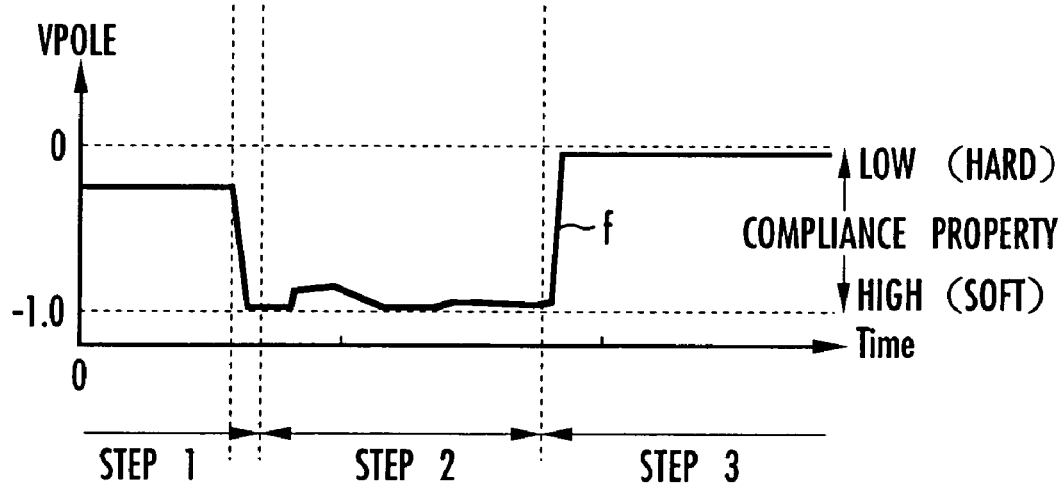

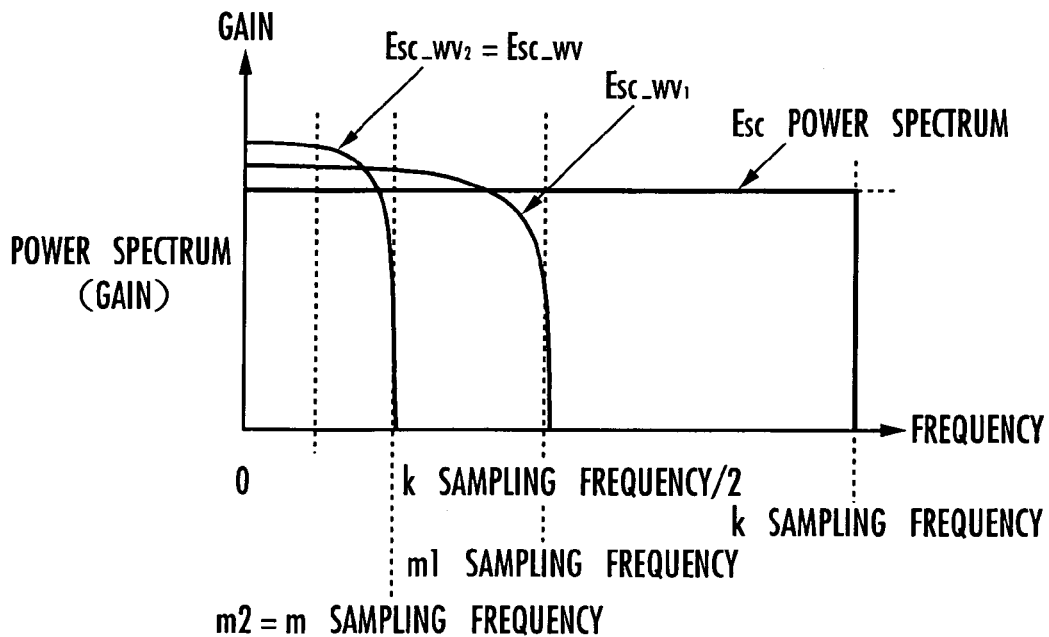

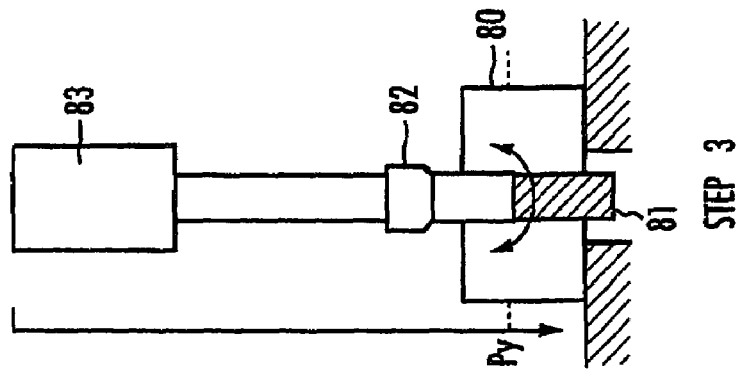
FIG. 14(c) STEP 3
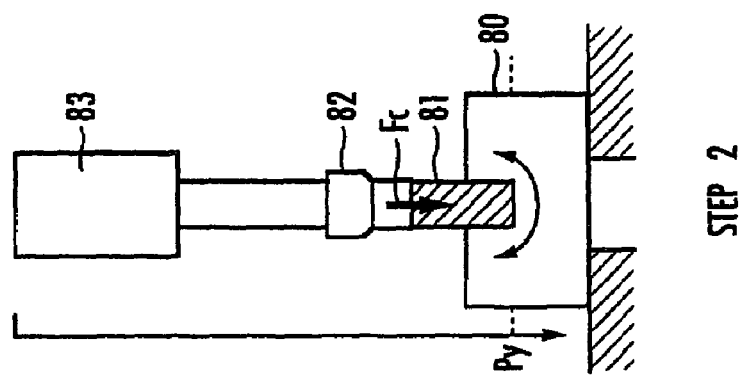
FIG. 14(b) STEP 2
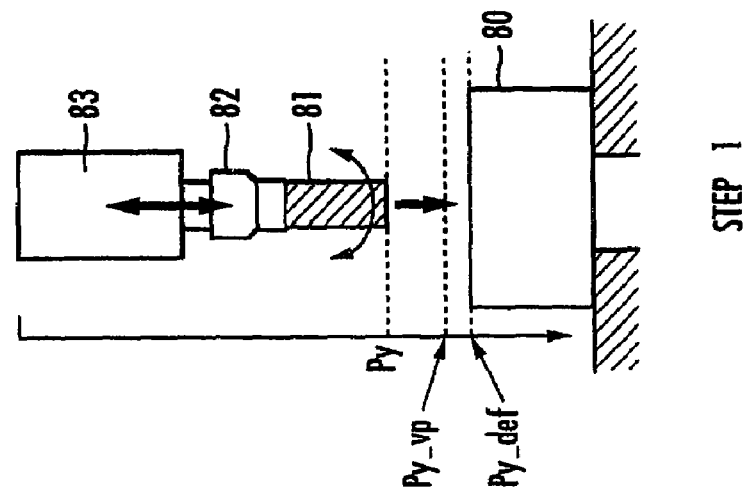
FIG. 14(a) STEP 1

-- PRIOR ART --

CONTROL APPARATUS OF CONTACT MECHANISM

BACKGROUND OF THE INVENTION

Field of the Invention

The present invention relates to a control apparatus for a contact mechanism to move a contact body to make contact with a contacted body by an actuator.

For example, as shown in FIG. 15, as a contact mechanism for moving a contact body to make contact with a contacted body by an actuator, a synchronizing mechanism 110 of a transmission is known in such a manner that a synchronizer ring 103 is disposed between a coupling sleeve 101 which is integrally rotated with an input shaft 100 connected to an engine and an electric motor of an automobile and a synchronized gear 102 which is connected to driving wheels (not shown) and rotatably and axially-immovably disposed to the input shaft 100, and the coupling sleeve 101 is moved through a shift fork 104 by an actuator 105, resulting in switching between connection/cutoff of the coupling sleeve 101 and the synchronized gear 102.

In the synchronizing mechanism 110, the coupling sleeve 101 is designed to have a hollow structure, and splines 111 are formed on the inner surface of a hollow section. Splines 112 engageable with splines 111 of the coupling sleeve 101 are formed on the outer surface of the synchronizer ring 103, and splines 113 which can be engaged with the splines 111 of the coupling sleeve 101 are formed on the outer surface of a part opposing the synchronizer ring 103 of the synchronized gear 102.

When the coupling sleeve 101 and the synchronized gear 102 are connected, the coupling sleeve 101 is moved in a direction of the synchronized gear 102 by the shift fork 104. When the coupling sleeve 101 and the synchronizer ring 103 make contact with each other to press the synchronizer ring 103 against the synchronized gear 102, a friction force between the synchronizer ring 103 and the synchronized gear 102 causes the rotational speed of the synchronized gear 102 to increase or decrease.

As a result, the rotational speed of the coupling sleeve 101 and the rotational speed of the synchronized gear 102 are synchronized so as to engage the splines 111 of the coupling sleeve 101 with the splines 112 of the synchronizer ring 103. Moreover, the coupling sleeve 101 is moved to engage the splines 111 of the coupling sleeve 101 with the splines 113 of the synchronized gear 102.

Now, if a moving speed of the coupling sleeve 101 is too fast when the coupling sleeve 101 presses the synchronizer ring 103 against the synchronized gear 102, the synchronizing mechanism 110 may be damaged from the coupling sleeve 101 bounced back or pushed in to the synchronized gear 102 with an excessive force when the coupling sleeve 101 comes into contact with the synchronizer ring 103.

For this reason, conventionally, while the coupling sleeve 101 is moved in the direction of the synchronized gear 102, the moving speed of the coupling sleeve 101 is arranged to decrease when a distance of the both parts reaches less than the predetermined value. In addition, there is known a method for reducing a degree of an impact during the contact between the coupling sleeve 101 and the synchronizer ring 103, by providing a mechanical cushioning mechanism such as a spring between an actuator 105 and the shift fork 104 (for example, see Patent Document 1).

Consequently, a provision of the mechanical cushioning mechanism in this way will not require to decrease the moving speed of the coupling sleeve 101, when the coupling sleeve 101 is contacted with the synchronizer ring 103. However, the provision of the mechanical cushioning mechanism may cause a cost of the synchronizing mechanism 110 to increase and a configuration for the synchronizing mechanism 110 to increase in complexity, and thereby resulting in decreasing the reliability of the synchronizing mechanism 110.

Patent Document 1
   Japanese Patent Laid-Open Publication No.2002-195406

SUMMARY OF THE INVENTION

In consideration of the above-mentioned background, it is an object of the present invention to provide a control apparatus of a synchronizing mechanism with a cost reduced, which can reduce an impact generated during a contact between a first engaging member and a synchronizing member, when the rotated first engaging member is pressed against the synchronizing member to be engaged with a second engaging member.

The present invention relates to a control apparatus for executing a contacting process in which a contact body is moved to come into contact with a contacted body by an actuator from a state that the contact body and the contacted body are spaced and opposed each other, by controlling an operation of a contact mechanism including the contact body movably provided in one axial direction, the actuator for moving the contact body connected therewith, and the contacted body making contact with the contact body when the contact body is moved to a predetermined position.

Additionally, the present invention is characterized by comprising target position setting means for setting a target position of the contact body in the contacting process, actual position ascertaining means for ascertaining an actual position of the contact body, and operation amount determining means for determining a first operation amount to drive an actuator so as to have a first state amount converge on an equilibrium point on a first switching function stipulated by a first linear function having at least a deviation between a target position and the actual position of the contact body as the first state amount and this first state amount as a variable by using response specifying-type control which can variably specify a damping behavior and a damping speed of the deviation in order to have the target position and the actual position of the contact body to match.

According to the present invention, the operation amount determining means may quickly damp the deviation between the actual position and the target position of the contact body without an oscillation by determining the first operation amount to drive the actuator using the response specifying-type control.

In addition, the present invention is characterized in that the operation amount determining means sets a computation coefficient of the first linear function depending on the actual position of the first engaging member.

In the present invention, as will be described later, the computation coefficient of the first linear function may be altered to change a control ability against a disturbance. Consequently, the operation amount determining means sets the computation coefficient of the first linear function depending on the actual position of the contact body. Accordingly, for example, in a process of moving the contact body toward the contacted body, the computation coefficient of the first linear function may be set in a direction that the control ability against the disturbance increases so as to stabilize a behavior of the contact body. Additionally, when the contact body comes into contact with the contacted body, the computation coefficient of the first linear function is set in a direction that the control ability against a disturbance decreases, so that elasticity may be generated between the contact body and the contacted body by starting the actuator to reduce an impact during the contact.

According to the present invention, the impact during the contact between the contact body and the contacted body can be reduced by generating elasticity without providing a mechanical cushioning mechanism as just described, and as a result, the contact body and the contacted body may be protected while controlling an increase in cost. In addition, a moving speed of the contact body does not need to be reduced prior to the contact between the contact body and the contacted body in order to reduce the impact during the contact, and consequently, a time until the contact body makes contact with the contacted body may be shortened.

Additionally, the present invention is characterized in that in the contacting process, the operation amount determining means sets the computation coefficient in the direction that the control ability against a disturbance decreases, when the first engaging member is moved to a position where a distance between the first engaging member and the synchronizing member is less than a predetermined distance.

According to the present invention, when the contact body comes close to the contacted body, the computation coefficient is set in a direction that the control ability against the disturbance decreases by the operation amount determining means. Accordingly, the control ability against the disturbance is reduced before the contact body comes close to the contacted body, so that the impact generated during the contact between the contact body and the contacted body may be reduced.

Additionally, the present invention is characterized in that the contact mechanism comprising a synchronizing mechanism for switching between transmission and cutoff of power; the contact body comprising a first engaging member which is connected to an input shaft connected to a driving source or an output shaft connected to a driving wheel; the contacted body comprising a synchronizing member which is provided rotatably to the first engaging member and a second engaging member and movably in the one direction between the first engaging member and the second engaging member connected to the shaft, either of the input shaft or the output shaft, to which the first engaging member is not connected, and makes contact with the first engaging member when the first engaging member is moved to a predetermined position, so that rotational speeds of the first engaging member and the second engaging member are synchronized in a state that the input shaft is rotated and thereby enabling the first engaging member and the second engaging member to be engaged with each other; and the contacting process comprises: a first step wherein the first engaging member is moved toward the second engaging member by the actuator to make the first engaging member to come into contact with the synchronizing member; and a second step wherein, subsequent to the first step, the first engaging member is pressed against the synchronizing member by the actuator, and thereby synchronizing the rotational speeds of the first engaging member and the second engaging member through the synchronizing member to engage the first engaging member and the second engaging member each other.

According to the present invention, for example, until the first engaging member comes into contact with the synchronizing member in the first step, the computation coefficient is set in the direction that the control ability against the disturbance increases, and thereby stabilizing a behavior of the first engaging member to allow the first engaging member to come close to the synchronizing member. In addition, when the first engaging member is brought into contact with the synchronizing member in the first step, the computation coefficient is set in the direction that the control ability against the disturbance decreases, so that elasticity may be generated by the operation of the actuator between the first engaging member and the synchronizing member to reduce the impact at the time of the contact.

Additionally, the present invention is characterized in that the operation amount determining means starts a processing in response to the second step when a degree of separation of the actual position of the first engaging member to the target position increases higher than a first predetermined level in the first step.

According to the present invention, until the first engaging member comes into contact with the synchronizing member in the first step, the actual position of the first engaging member follows the target position without delay, and as a result the degree of separation of the actual position of the first engaging member to the target position decreases. When the first engaging member comes into contact with the synchronizing member, a reaction force from the synchronizing member controls a movement of the first engaging member, resulting in rapidly increasing the degree of separation of the actual position of the first engaging member to the target position. Therefore, when the degree of separation of the actual position of the first engaging member to the target position increases higher than the first predetermined level, the operation amount determining means judges that the first engaging member and the synchronizing member are brought into contact each other, so that a processing in response to the second step may be started.

Additionally, the present invention is characterized in that the operation amount determining member comprises pressing force ascertaining means for ascertaining a pressing force to the synchronizing member caused by the first engaging member, and wherein the computation coefficient of the first linear function is set so as to match the pressing force determined by the pressing force ascertaining means with a predetermined target pressing force in the second step.

According to the present invention, as described above, the computation coefficient of the first linear function may be altered to change the control ability against the disturbance. However, when the control ability against the disturbance is changed as just mentioned, in response to such a change, the pressing force against the synchronizing member caused by the first engaging member is changed.

Accordingly, the operation amount determining means sets the computation coefficient depending on the actual position of the first engaging member in the first step, as well as the computation coefficient to match the pressing force against the synchronizing member caused by the first engaging member with the target pressing force in the second step. As just described, a control of the elasticity between the first engaging member and the synchronizing member in the first step and a control of the pressing force caused by the first engaging member in the second step are performed by changing one parameter which is the computation coefficient, thereby stably making a transition from the first step to the second step. Consequently, a behavior of the synchronizing mechanism may be controlled from becoming unstable while making this transition.

In addition, the present invention is characterized in that the operation amount determining means determines the first operation amount to stop the first engaging member from moving, when the degree of separation of the actual position of the first engaging member to the target position decreases more than the second predetermined level in the second step.

According to the present invention, when a reaction force from the synchronizing member decreases in the second step, a moving speed of the first engaging member increases, resulting in rapidly decreasing the degree of separation of the actual position of the first engaging member to the target position. And, such a decrease of the reaction force from the synchronizing member is generated when the rotational speeds of the first engaging member and the second engaging member are synchronized and both of the engaging members are engaged each other.

Consequently, in this case, the operation amount determining means promptly stops the movement of the first engaging member by determining the operation amount to stop the movement of the first engaging member, and thereby allowing the first engaging member to prevent the synchronizing member from being pushed in too far.

In addition, the present invention is characterized in that the operation amount determining means sets the computation coefficient in the direction that the control ability against the disturbance increases, when the degree of separation of the actual position of the first engaging member to the target position decreases more than the second predetermined level in the second step.

According to the present invention, when the engagement between the first engaging member and the second engaging member is completed, the control ability against the disturbance increases to control the behavior of the first engaging member, so that the first engaging member may easily be stopped.

Additionally, the present invention is characterized in that the operation amount determining means ascertains the degree of the separation of the actual position of the first engaging member to the target position based on a transformation value with which filtering using a wavelet transformation is applied to time series data of a deviation between the actual position of the first engaging member and the target position.

According to the present invention, as will be described later, when the filtering is applied to the deviation between the actual position of the first engaging member and the target position, high frequency noise elements of the deviation are eliminated, resulting in improving a SN ratio of a variation of low frequency elements. As a result, the operation amount determining means can precisely determine the degree of the separation of the actual position of the first engaging member to the target position based on the transformation value applied with the filtering.

Additionally, the present invention is characterized in that the operation amount determining means sets the computation coefficient so as to have a second state amount converge on an equilibrium point on a second switching function stipulated by a second linear function having at least the deviation as the second state amount, the computation coefficient as a second operation amount, and the second state amount as a variable, by using the response specifying-type control which can variably specify a damping behavior and a damping speed of the deviation between the target pressing force and the pressing force ascertained by the pressing force ascertaining means to have the target pressing force and the pressing force determined by the pressing force ascertaining means to match in the second step.

According to the present invention, the operation amount determining means may match the pressing force to the synchronizing member caused by the first engaging member with the target pressing force, and stabilizing the behavior of the first engaging member, by gathering the second state amount on the equilibrium point on the second switching function.

Additionally, the present invention is characterized in that the actuator is an electric actuator in which an output changes depending on an value of an electric current to be supplied, the first operation amount is an electric voltage supplied to the electric actuator, and the pressing force ascertaining means detects the electric current supplied to the electric actuator to ascertain a pressing force to the synchronizing member caused by the first engaging member based on the value of the supplied electric current.

According to the present invention, the pressing force ascertaining means may easily ascertain the pressing force to the synchronizing member caused by the first engaging member based on the detected value of the electric current supplied to the actuator. The operation amount determining means may then easily control the pressing force to the synchronizing member caused by the first engaging member by adjusting the electric voltage supplied to the actuator as the first operation amount.

In addition, the present invention is characterized in that the operation amount determining means uses adapting sliding mode control as the response specifying-type control based on the first switching function.

According to the present invention, the operation amount determining means uses the adapting sliding mode control to control an influence from a disturbance and an error of the contact mechanism of the response specifying-type control modeling, and thereby allowing the first state amount to be controlled to stably converge on the first switching function.

Additionally, the present invention is characterized in that the operation amount determining means calculates the first operation amount according to a sum of an equivalent control input calculated by using a value of the first linear function, a reaching rule input, and an adapting rule input, so that a gain of the reaching rule input and a gain of the adapting rule input are set at values satisfying a stability condition that the first state amount converges on the first switching function.

According to the present invention, the operation amount determining means sets the gain of the reaching rule input and the gain of the adapting rule input at the values satisfying the stability condition that the first state amount converges on the first switching function, and thereby allowing the first operation amount to surely converge on the first switching function.

Additionally, the present invention is characterized in that the operation amount determining means uses a control for calculating a control input depending on the value of integration of the first switching function as the response specifying-type control based on the first switching function.

According to the present invention, the control for calculating the control input depending on the value of integration of the first switching function is used as the response specifying-type control based on the first switching function, thereby controlling the influence from the disturbance and the error of the modeling, and resultingly, the operation amount determining means may stably gather the first state amount to be controlled on the first switching function.

In addition, the present invention is characterized in that the operation amount determining means calculates the first operation amount according to a sum of a proportional term of the equivalent control input calculated by using the first linear function and the first switching function and an integral term of the first switching function, and thereby setting a gain of the proportional term of the first switching function and a gain of the integral term of the first switching function at the values satisfying the stability condition that the first state amount converges on the first switching function.

According to the present invention, the first operation amount is calculated according to the sum of the proportional term of the equivalent control input calculated by using the first linear function and the first switching function and the integral term of the first switching function, thereby setting the gain of the proportional term of the first switching function and the gain of the integral term of the first switching function at the values satisfying the stability condition that the first state amount converges on the first switching function, and resultingly, the operation amount determining means can surely gather the first operation amount on the first switching function.

BRIEF DESCRIPTION OF THE DRAWINGS

FIG. 9 is a graph showing switching timing of the controlling process;

FIG. 11 is an explanatory diagram for a decimation processing in the wavelet-transform filter;

FIG. 14(a) is a view showing the first step in a process for making a hole by a machine tool;

FIG. 14(b) is a view showing the second step in a process for making a hole by a machine tool;

FIG. 14(c) is a view showing the third step in a process for making a hole by a machine tool.

DESCRIPTION OF THE PREFERRED EMBODIMENT

Figure 1:
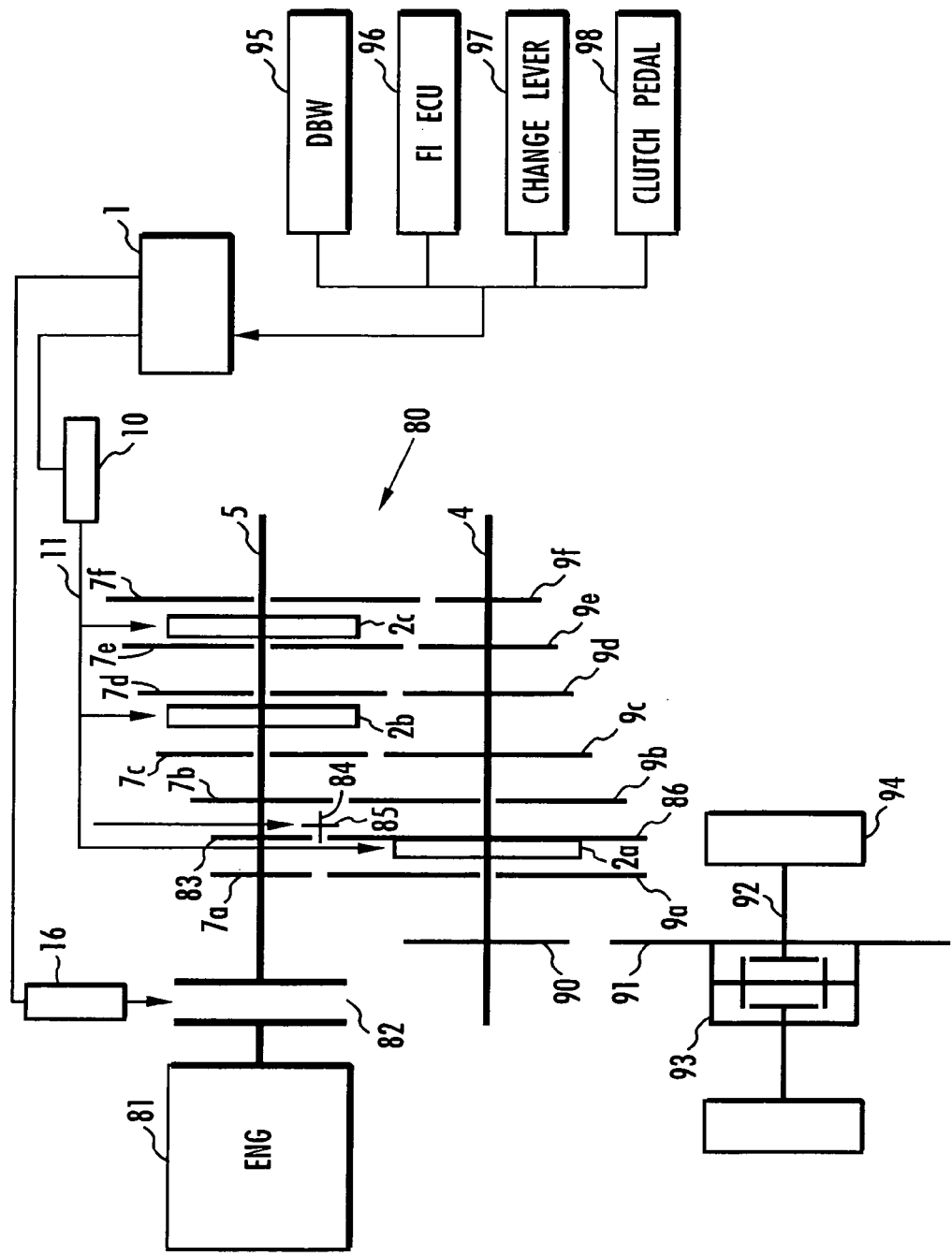
FIG. 1 is a block diagram of a transmission having a synchronizing mechanism.
Figure 2:
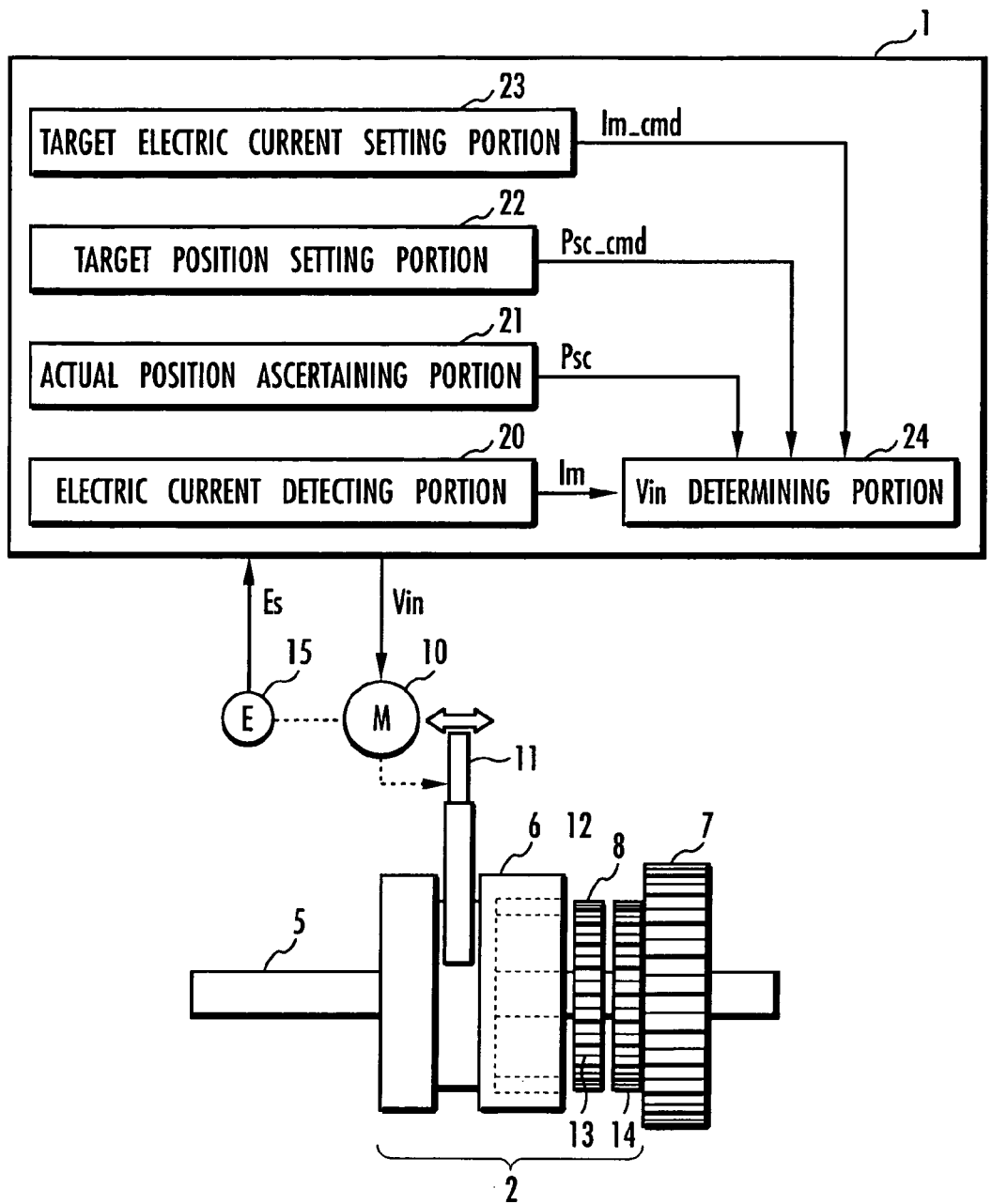
FIG. 2 is a block diagram of a synchronizing mechanism and a control apparatus thereof.
Figure 3:
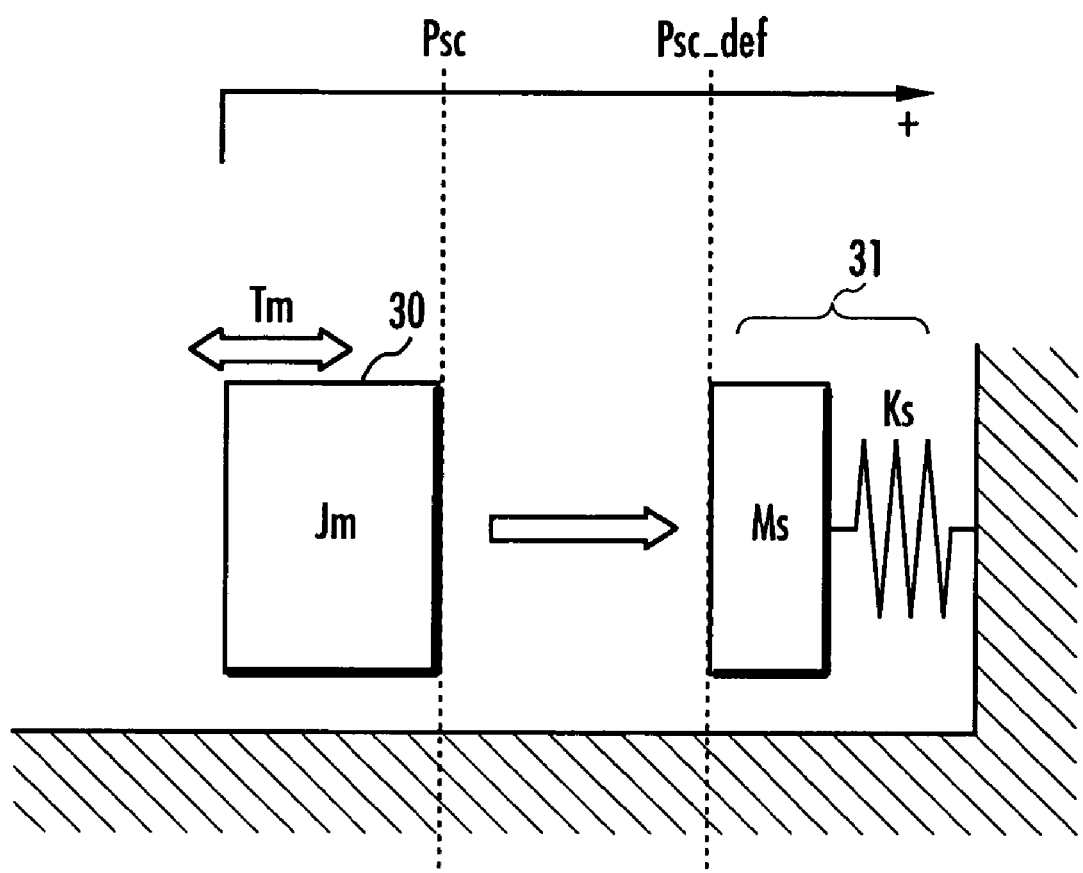
FIG. 3 is an explanatory diagram of the modeled synchronizing mechanism shown in FIG. 1.
Figure 4:
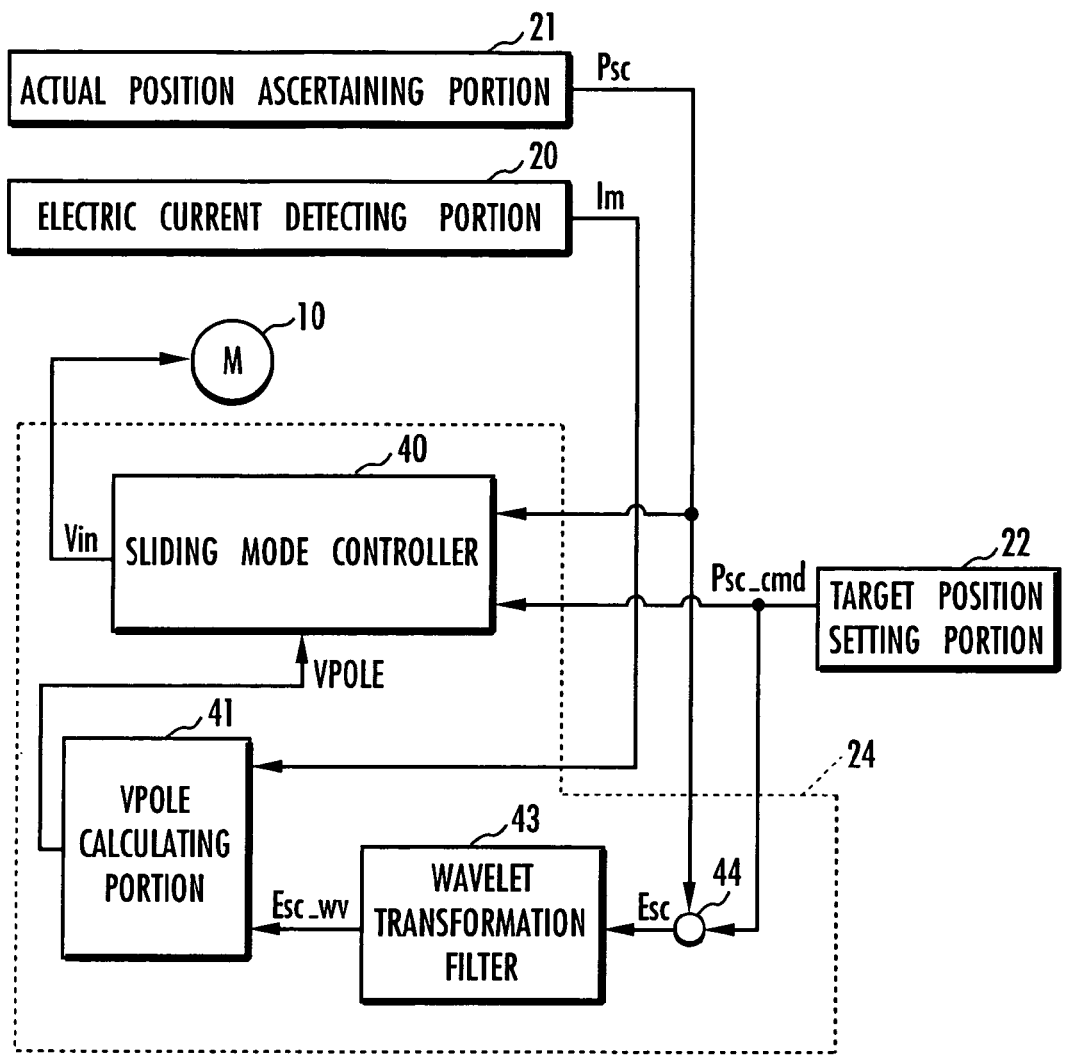
FIG. 4 is a control block diagram for the control apparatus shown in FIG. 1.
Figure 5:
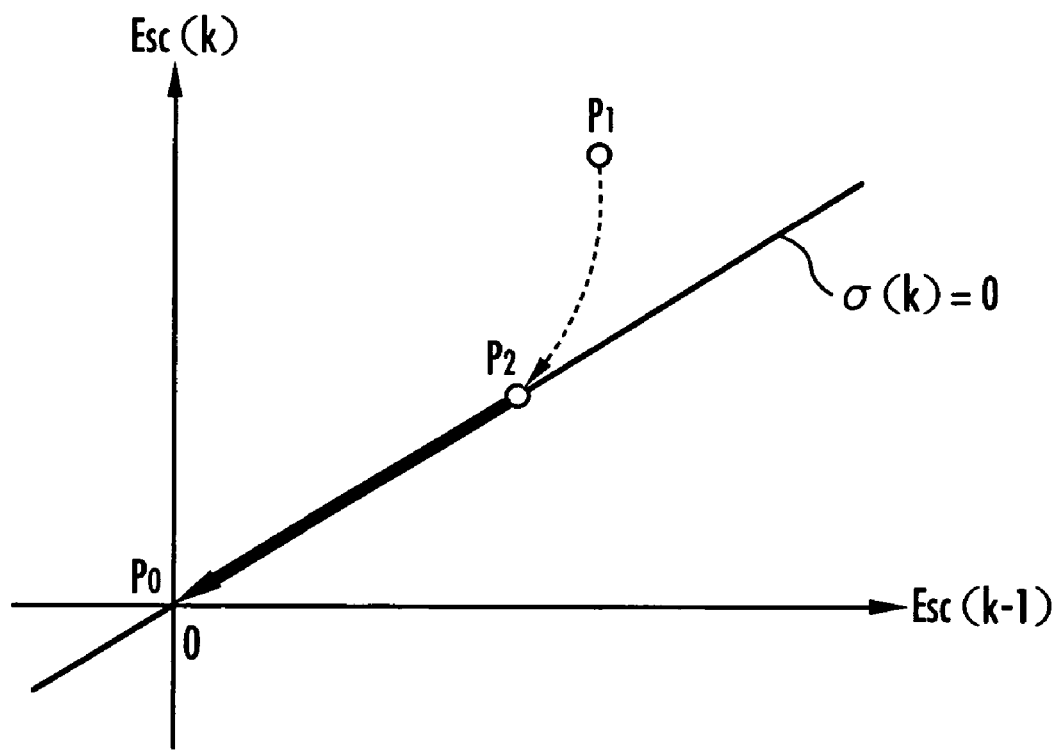
FIG. 5(a) is a graph showing a behavior of a sliding mode controller shown in FIG. 4, plotting the deviation ESC with respect to (k) over the deviation ESC with respect to (k−1)
FIG. 5(b) is a graph showing a behavior of a sliding mode controller shown in FIG. 4, plotting the deviation ESC over time k.
Figure 5:
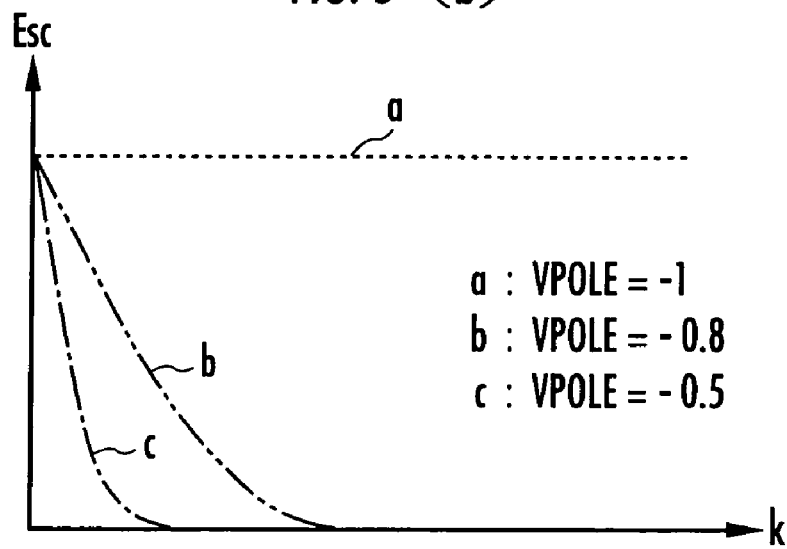
Figure 6A:
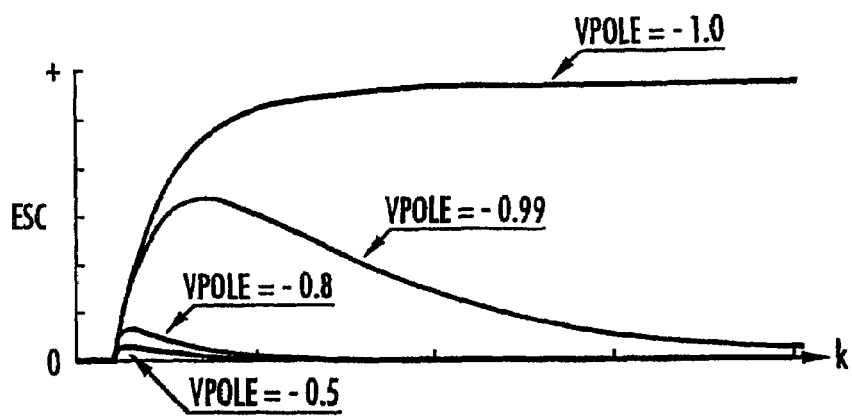
FIG. 6(a) is a graph showing an effect according to a change of compliance parameter, plotting a deviation ESC over time k.
Figure 6B:
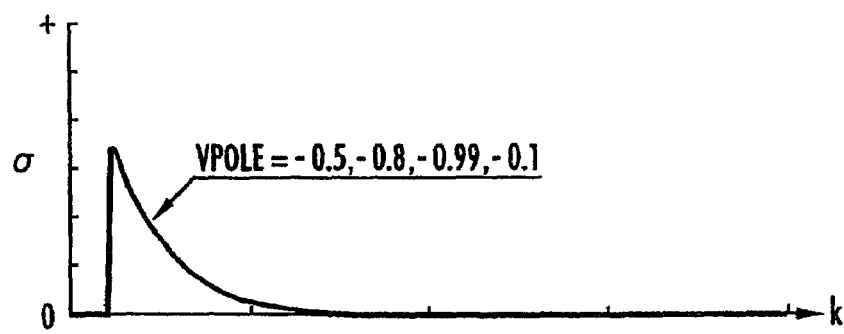
FIG. 6(b) is a graph showing an effect according to a change of compliance parameter. plotting a switching function σ over time k.
Figure 6C:
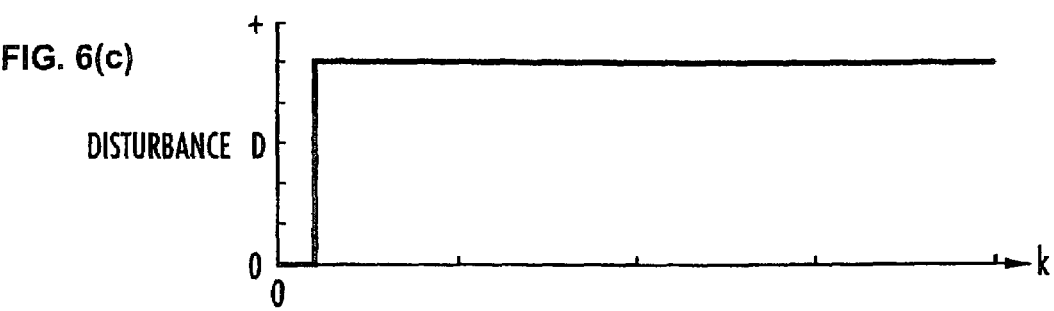
FIG. 6(c) is a graph showing an effect according to a change of compliance parameter. plotting a disturbance D over time k.
Figure 7:
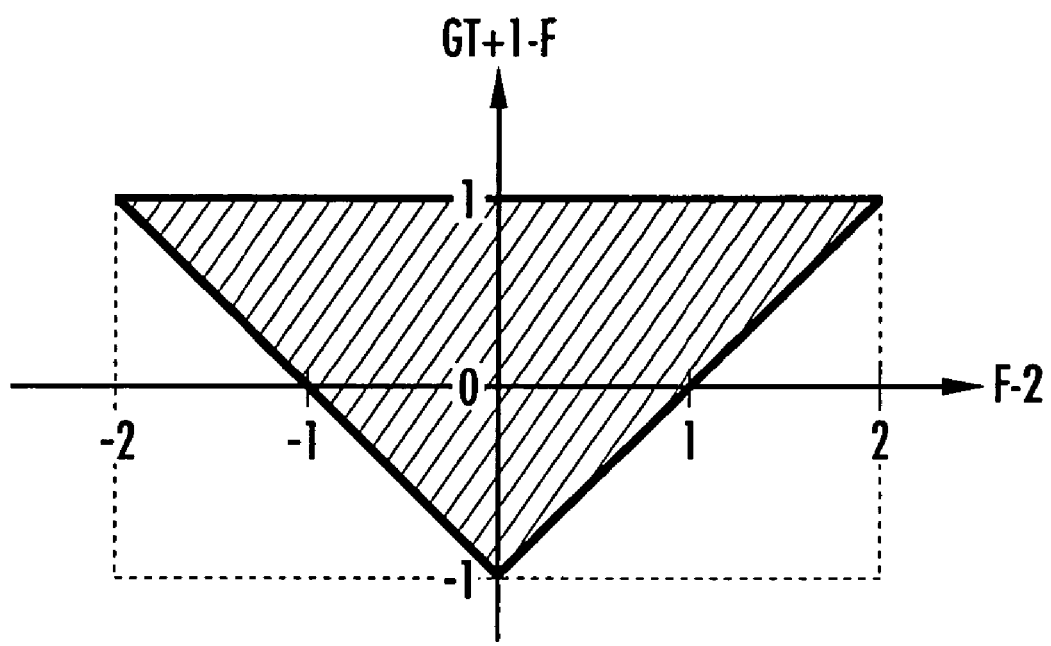
FIG. 7 is a graph showing a setting requirement for a reaching rule gain and an adapting rule gain.
Figure 8:
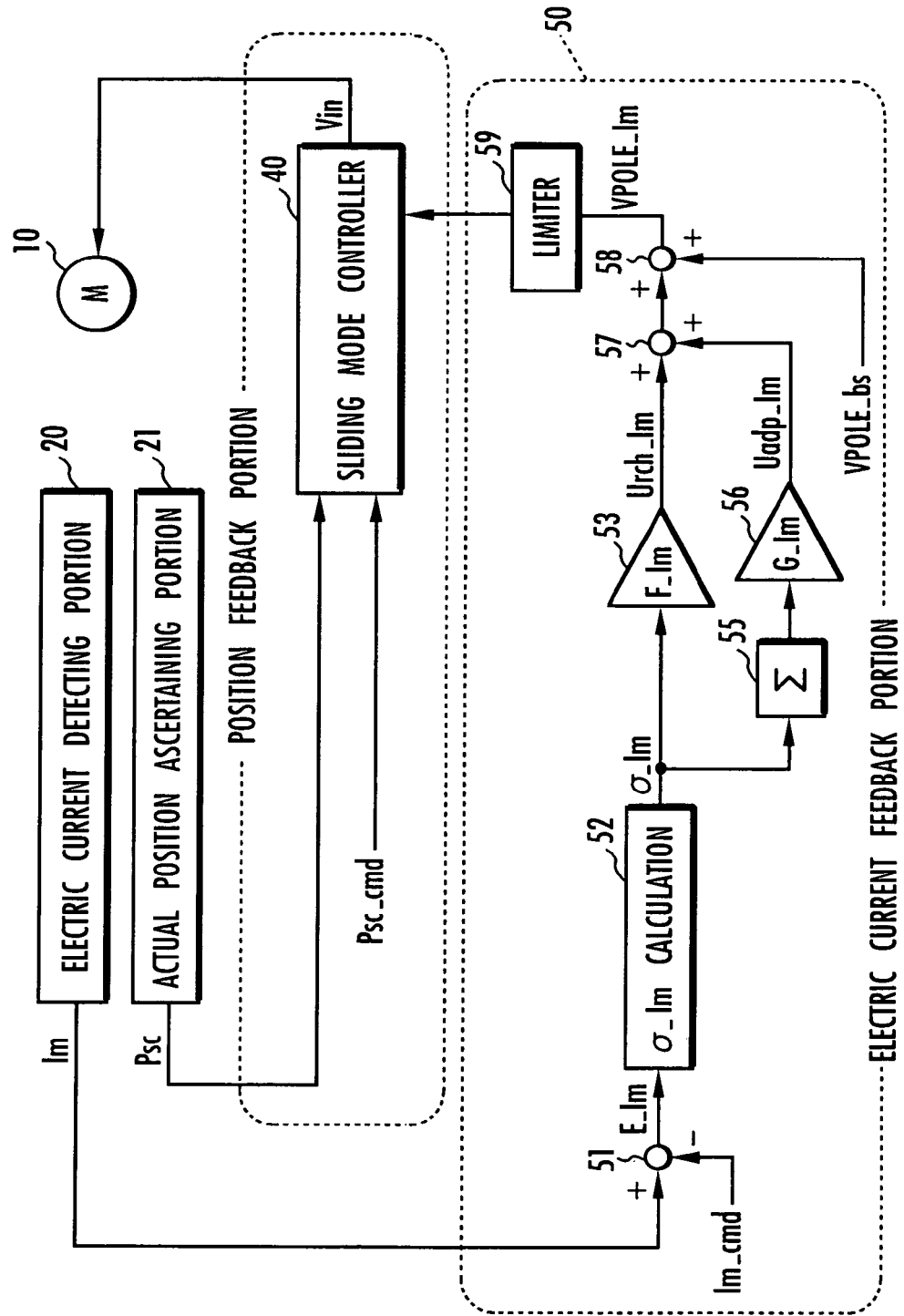
FIG. 8 is a control block diagram of the control apparatus in which electric current feedback processing is added.
Figure 10:
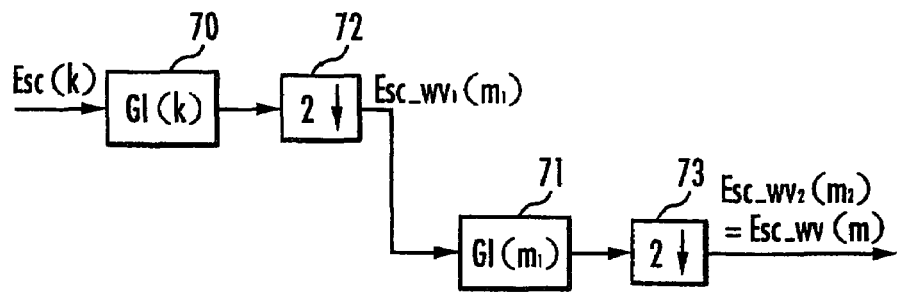
FIG. 10(a) is a block diagram of a wavelet-transform filter.
FIG. 10(b) is a graph showing gain over sampling freguency for the half band low-pass filters.
FIG. 10(c) is a graph showing the phase in degrees over the sampling freguency for the half band low-pass filters.
Figure 10:
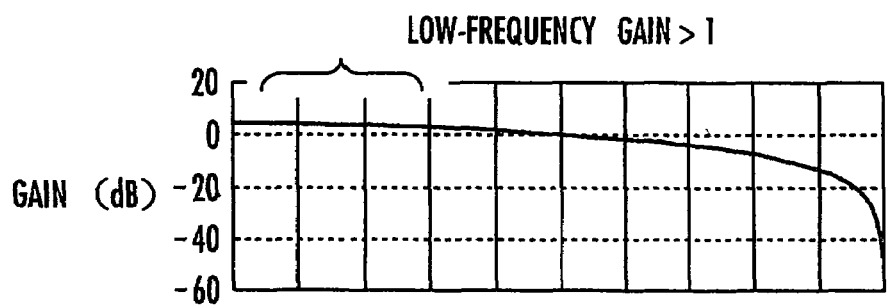
Figure 10C:
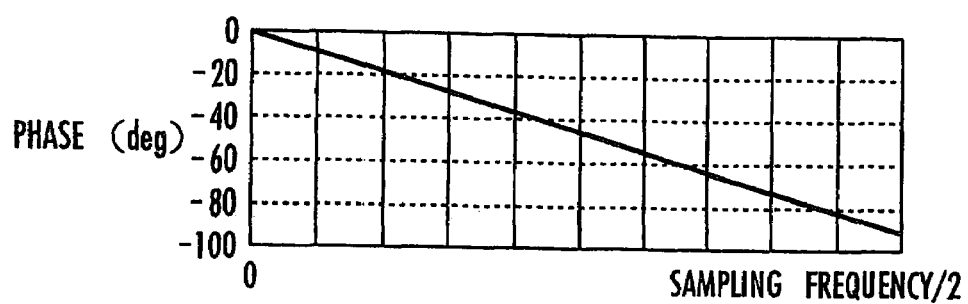
Figure 12:
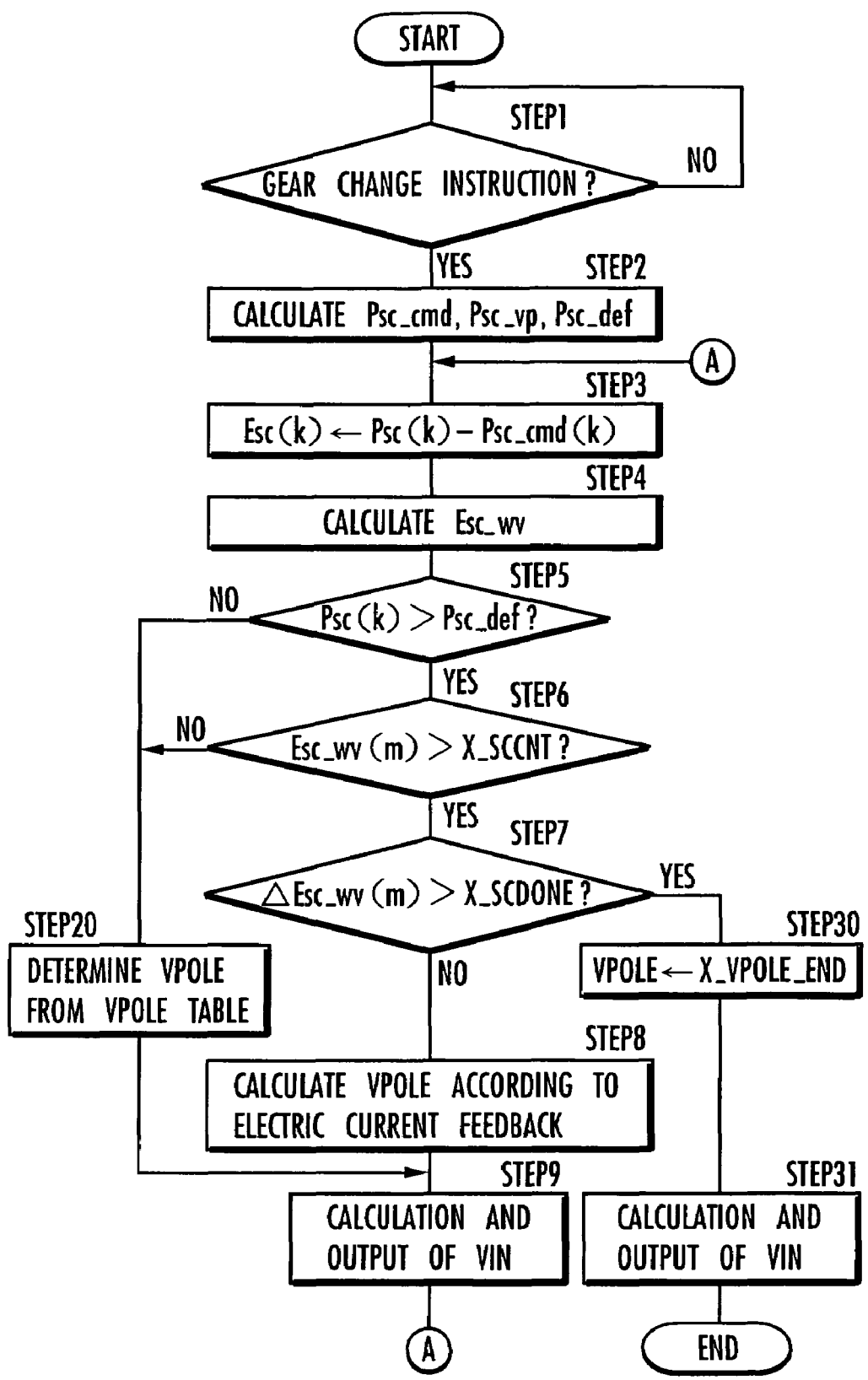
FIG. 12 is an operational flowchart of the control apparatus.
Figure 13:
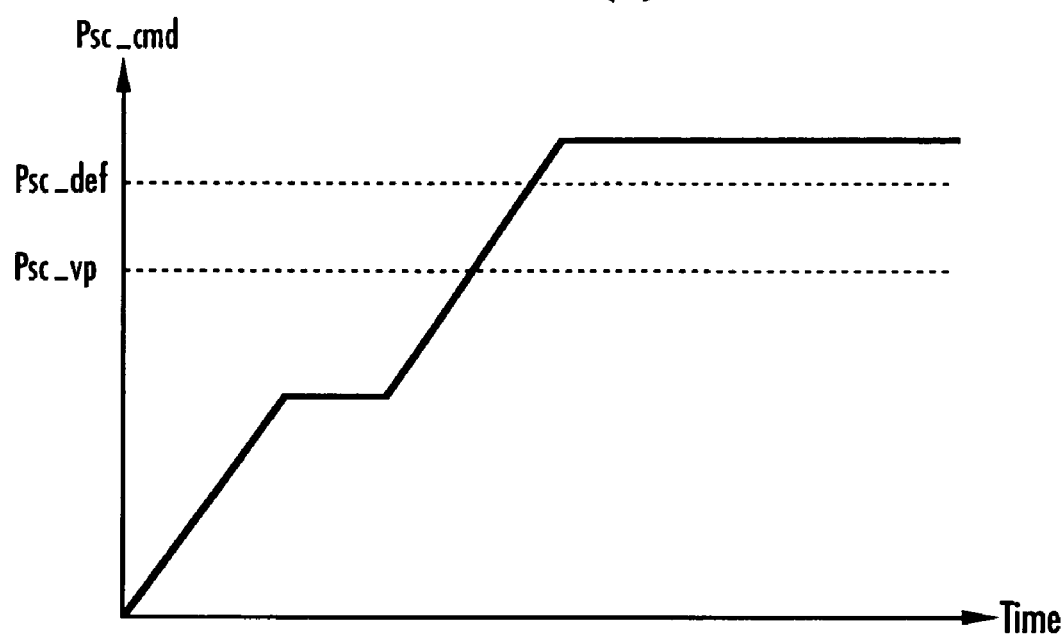
FIG. 13(a) is a view showing a setting table of a target position and a compliance parameter.
FIG. 13(b) is a view showing a setting table of the compliance parameter and an actual position.
Figure 13:
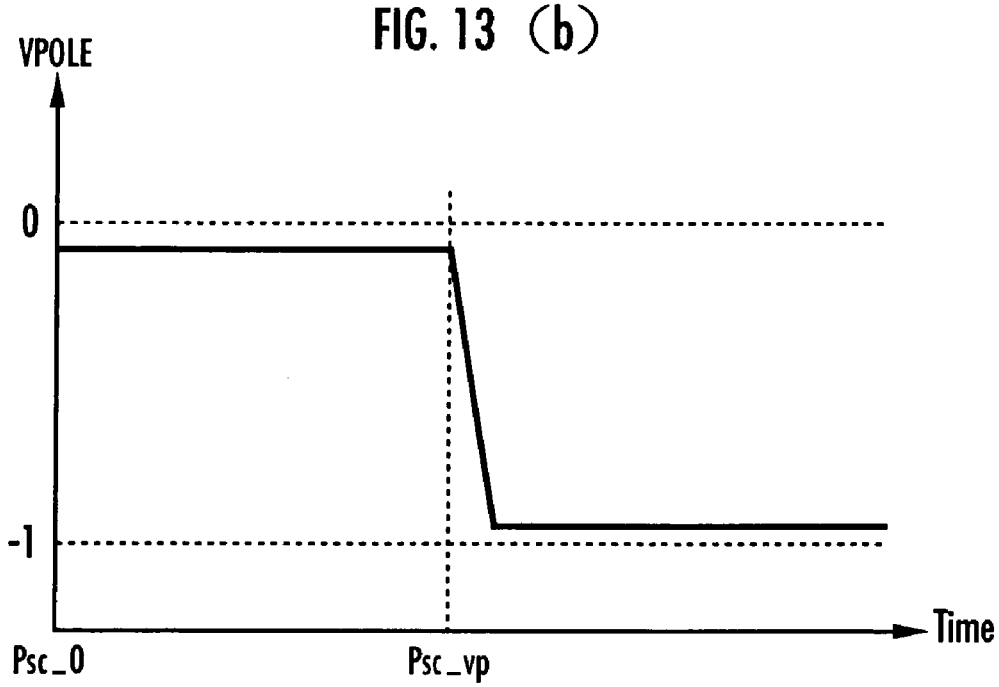
Figure 15:
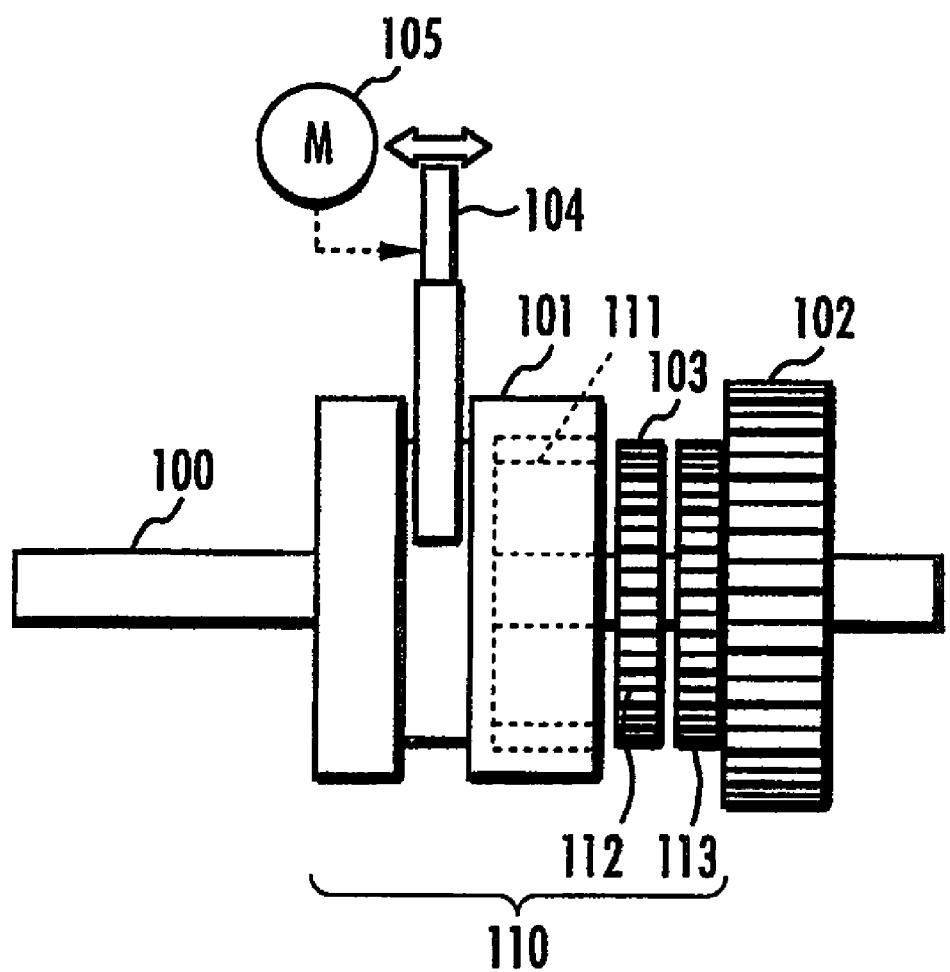
FIG. 15 is a block diagram of a known synchronizing mechanism. mechanism.

Referring to FIGS. 1 through 14, an embodiment according to the present invention is described. FIG. 1 is a block diagram of a transmission having a synchronizing mechanism; FIG. 2 is a block diagram of the synchronizing mechanism and its control apparatus; FIG. 3 is an explanatory diagram of the modeled synchronizing mechanism shown in FIG. 1; FIG. 4 is a control block diagram for the control apparatus shown in FIG. 1; FIG. 5 is a graph showing an action of a sliding mode controller shown in FIG. 4; FIG. 6 is a graph showing an effect according to a change of compliance parameter; FIG. 7 is a graph showing a setting requirement for a reaching rule gain and an adaptive rule gain; FIG. 8 is a control block diagram of the control apparatus in which electric current feedback processing is added; FIG. 9 is a graph showing switching timing of the controlling process; FIG. 10 is a block diagram of a wavelet-transform filter; FIG. 11 is an explanatory diagram for decimation processing in the wavelet-transform filter; FIG. 12 is an operational flowchart of the control apparatus; FIG. 13 is a view showing a setting table of a target position and a compliance parameter; and FIG. 14 is a view showing a process for making a hole by a machine tool.

Referring to FIG. 1, a transmission 80 is designed to transfer an output from an engine 81 through a clutch 82 and a connecting gear 90. The connecting gear 90 is, then engaged with a gear 91 of a differential 93, and thereby transferring the output from the engine 81 through a driving shaft 92 to a driving wheel 94.

In the transmission 80, its operation is controlled by a control apparatus 1 (corresponding to the control apparatus for a contact mechanism of the present invention), an electronic unit configured with a microcomputer, a memory, and the like. The control apparatus 1 controls a change gear operation of the transmission 80 by driving an electric motor 10 (corresponding to the actuator of the present invention) and an actuator 16 for a clutch, depending on a condition of an accelerator mechanism 95, a fuel supply controlling unit 96, a change lever 97, and a clutch pedal 98.

The transmission 80 includes an input shaft 5, an output shaft 4, first- to sixth-speed forward gears in pairs (7a to 7f and 9a to 9f), a reverse gear shaft 84 and a reverse gear row 83, 85, 86. The input shaft 5, the output shaft 4, and the reverse gear shaft 84 are disposed parallel to each other.

The first- to sixth-speed forward gears in pairs, 7a to 7f and 9a to 9f, are set at a different gear ratio, respectively. The input side first-speed forward gear 7a and the input side second forward gear 7b are integrally provided with the input shaft 5, and a corresponding output side first-speed forward gear 9a and output side second-speed forward gear 9b are configured with an idler gear rotatable to the output shaft 4. A synchronizing mechanism 2a for first and second speeds can switch between the state in that the output side first-speed forward gear 9a and the output side second-speed forward gear 9b are selectively connected to the output shaft 4 and the state in that the both gears 9a, 9b are cut off from the output shaft 4, respectively.

Additionally, the input side third-speed forward gear 7c and the input side fourth-speed forward gear 7d are configured with an idler gear rotatable to the input shaft 5, and a corresponding output side third-speed forward gear 9c and output side fourth-speed forward gear 9d are integrally provided with the output shaft 4. A synchronizing mechanism 2b for third and fourth speeds can switch between the state in that the input side third-speed forward gear 7c and the input side fourth-speed speed gear 7d are selectively connected to the input shaft 5, and the state in that the both gears 7c, 7d are cut off from the input shaft 5, respectively.

In the same manner, the input side fifth-speed forward gear 7e and the input side sixth-speed forward gear 7f are configured with an idle gear ratatable to the input shaft 5, and the corresponding output side fifth-speed forward gear 9e and output side sixth-speed forward gear 9f are integrally provided with the output shaft 4. A synchronizing mechanism 2c for fifth and sixth speeds can switch between the state in that the input side fifth- and sixth-speed forward gears 7e, 7f are selectively connected to the input shaft 5, and the state in that the both gears 7e, 7f are respectively cut off from the input shaft 5.

Additionally, the reverse gear row 83, 85, 86 comprises the first reverse gear 85 mounted to the reverse gear shaft 84, the second reverse gear 83 integrally provided with the input shaft 5, and the third reverse gear 86 integrated with the synchronizing mechanism 2a for first and second speeds of the output shaft 4. The first reverse gear 85 is mounted to the reverse gear shaft 84 by spline engagement. Accordingly, the first reverse gear 85 is integrally rotated with the reverse gear shaft 84, and is adapted to be slidable in an axial direction of the reverse gear shaft 84 between a position that the first reverse gear 85 is engaged with both of the second reverse gear 83 and the third reverse gear 86 (engagement position) and a position that the first reverse gear 85 is disengaged from both of the gears (disengagement position).

A shift fork 11 is then connected to the first reverse gear 85, so that the first reverse gear 85 is switched between the engagement position and the disengagement position through the shift fork 11 by the operation of the electric motor.

FIG. 2 shows a configuration of the synchronizing mechanism 2 (2b–2c, corresponding to the contact mechanism of the present invention) shown in FIG. 1. Further, the synchronizing mechanism 2a is different from the synchronizing mechanisms 2b, 2c in the point that the synchronizing mechanism 2a is provided to the output shaft 4, but has a basic configuration and operating description in common with the synchronizing mechanisms 2b, 2c.

The synchronizing mechanism 2 comprises a coupling sleeve 6 (corresponding to the contact body and the first engaging member of the present invention), integrally rotated with the input shaft 5 connected to an engine or an electric motor, a synchronized gear 7 (the input side third-speed forward gear 7c or the input side fourth-speed forward gear 7d to a synchronizing gear 2b, and the input side fifth-speed forward gear 7e or the input side sixth-speed forward gear 7f to a synchronizing gear 2c, corresponding to a second engaging member of the present invention), which is connected with an output shaft (not shown) connected to driving wheels (not shown), and is rotatably and axially-immovably provided to the input shaft 5, a synchronizer ring 8 (corresponding to the contacted body and a synchronizing member of the present invention), which is provided rotatably to the input shaft 5 between the coupling sleeve 6 and the synchronized gear 7, and movably in an axial direction of the input shaft 5 (corresponding to one axial direction of the present invention), and the shift fork 11 which is connected with the electric motor 10 (corresponding to the actuator and the electric actuator of the present invention) and the coupling sleeve 6.

The shift fork 11 moves the coupling sleeve 6 in the axial direction of the input shaft 5 in response to the rotation of the electric motor 10. Additionally, the coupling sleeve 6 is designed to be a hollow structure, so that splines 12 are formed on the inner surface of the hollow portion. Splines 13 engageable with the splines 12 of the coupling sleeve 6 is then formed on the peripheral surface of the synchronizer ring 8, and splines 14 engageable with the splines 12 of the coupling sleeve 6 is also formed on a part of the peripheral surface opposing to the synchronizer ring 8 of the synchronized gear 7.

When the coupling sleeve 6 rotated together with the input shaft 5 is moved in a direction of the synchronized gear 7 by the shift fork 11, the coupling sleeve 6 and the synchronizer ring 8 comes into contact with each other, and furthermore, the synchronizer ring 8 and the synchronized gear 7 will also comes into contact with each other. At this point, a friction force generated from contacting causes the rotational speeds of the coupling sleeve 6 and the synchronized gear 7 to be synchronized through the synchronizer ring 8.

As just described, when the coupling sleeve 6 is moved even further in the direction of the synchronized gear 7 in the state that the rotational speeds of the coupling sleeve 6 and the synchronized gear 7 are synchronized, the splines 12 formed on the coupling sleeve 6 passes the splines 13 formed on the synchronizer ring 8 to be engaged with the splines 14 formed on the synchronized gear 7. Accordingly, power will be transferred between the input shaft 5 and an output shaft.

Additionally, the electric motor 10 is actuated by the application of voltage output from the control apparatus 1 (Vin, corresponding to an operation amount and a first operation amount of the present invention), and a rotational speed detection signal (Es) of the electric motor 10 by the a rotational speed sensor 15 is input into the control apparatus 1.

The control apparatus 1 comprises an electric current detecting portion 20 for detecting electric current supplied to an armature of the electric motor 10 (Im, hereinafter referred to as an armature current), an actual position ascertaining portion 21 (corresponding to actual position ascertaining means of the present invention) for ascertaining an actual position of the coupling sleeve 6 (Psc) based on the rotational speed detection signal (Es) from the rotational speed sensor 15, a target position setting portion 22 (corresponding to target position setting means of the present invention) for setting a target position of the coupling sleeve 6 (Psc_cmd) in the process of moving the coupling sleeve 6 to be engaged with the synchronized gear 7 through the synchronizer ring 8, a target electric current setting portion 23 for setting a target electric current (Im_cmd) which is a target value of the electric current supplied to the electric motor 10, and a electric voltage setting portion 24 (corresponding to operation amount determining means of the present invention) for determining the voltage applied to the electric motor 10 (Vin, corresponding to an operation amount and a first operation amount of the present invention).

Consequently, the actual position ascertaining portion 21 interprets behaviors, in which after the coupling sleeve 6 starts moving, the rotational speeds of the coupling sleeve 6 and the synchronized gear 7 are synchronized by making contact with the synchronizer ring 8, and until the coupling sleeve 6 and the synchronized gear 7 complete to engage each other through the synchronizer ring 8, as a collision of an inertial system object and an elastic system object, and thereby modeling thereof, resulting in locating the position of the coupling sleeve 6 based on the model.

FIG. 3 shows the above-mentioned model. The actual position ascertaining portion 21 interprets the coupling sleeve 6 as an inertial system object 30, which its equivalent inertia is Jm, including the electric motor 10 and the shift fork 11 (see FIG. 2), and the synchronizer ring 8 (see FIG. 2) as an elastic system object 31 which its equivalent inertia is Ms and a spring coefficient is Ks, so as to ascertain the actual position of the coupling sleeve 6. Further, in FIG. 3, Tm indicates output torque of the electric motor 10 and Psc_def indicates a standby position of the synchronizer ring 8 (see FIG. 2). A calculating procedure for a model equation indicating the model shown in FIG. 3 is described below.

First, derivation of a model equation of a continuous time system before the coupling sleeve 6 makes contact with the synchronizer ring 8 is described.

The motion equation of the electric motor 10 shown in FIG. 2 is given by the following equation (1):

$$Jm \cdot \dot{\omega} = Tm \quad (1)$$

where Jm is equivalent inertia of the coupling sleeve 6 including the electric motor 10 and the shift fork 11, ω is the rotational speed of the electric motor 10 (detected by the rotational speed sensor 15), and Tm is the output torque of the electric motor 10.

In addition, a relationship between the output torque of the electric motor 10 (Tm) and the armature current (Im) of the electric motor 10 is given by the following equation (2):

$$Tm = Km \cdot Im \quad (2)$$

where Im is the armature current of the electric motor 10, and Km is torque conversion coefficient.

The relationship between electric voltage generated in the armature of the electric motor 10 (Vm, hereinafter referred to as armature voltage) and electric resistance of the armature (Rm, hereinafter referred to as armature resistance) is given by the following equation (3):

$$Vm = Rm \cdot Im \quad (3)$$

where Vm is the armature voltage of the electric motor 10, and Rm is the electric resistance of the electric motor 10.

Therefore, an equation (4) can be given by applying a relationship between the above equation (2) and equation (3) to the above equation (1) as follows:

$$Vm = \frac{Jm \cdot Rm}{Km} \dot{\omega} \quad (4)$$

Furthermore, a relationship between applied voltage to the electric motor 10 (Vin) and a back electromotive force generated in the electric motor 10 is given by the following equation (5):

$$Vin = Km' \cdot \omega + Vm \quad (5)$$

where Vin is the applied voltage to the electric motor 10, and Km' is a constant of the back electromotive force.

Consequently, a relationship of the above equation (5) is applied to the above equation (4) to obtain the following equation (6):

$$Vin = Km' \cdot \omega + \frac{Jm \cdot Rm}{Km} \dot{\omega} \quad (6)$$

In addition, a relationship between the rotational speed (ω) and rotational angle (θ) of the electric motor 10, and a position of the inertia system object 30 (Psc) is given by the following equations (7) and (8):

$$\theta = \int_0^t \omega dt \quad (7)$$

$$Psc = Rsc \cdot \theta \quad (8)$$

where ω is the rotational speed of the electric motor 10, θ is the rotational angle of the electric motor 10, t is elapsed time after the electric motor 10 starts to be actuated, and Rsc is a lever ratio and a gear ratio between the rotational angle (θ) of the electric motor 10 and the inertia system object 30.

Accordingly, the equations (9), (10), and (11) can be obtained from the above equations (7) and (8) as follows:

$$Psc = \int_0^t Rsc \cdot \omega dt \quad (9)$$

$$\dot{Psc} = \dot{Rsc} \cdot \theta = Rsc \cdot \dot{\theta} \quad \text{※} \quad \dot{Rsc} = 0 \quad (10)$$
$$= Rsc \cdot \dot{\theta}$$
$$= Rsc \cdot \omega$$

$$\ddot{Psc} = \dot{Rsc} \cdot \omega + Rsc \cdot \dot{\omega} \quad (11)$$
$$= Rsc \cdot \dot{\omega}$$

Consequently, the above equations (9), (10), and (11) can be substituted into the above equation (6) to obtain the following equation (12):

$$\ddot{Psc} = \frac{-Km' Km}{JmRm} \dot{Psc} + \frac{Km \cdot Rsc}{Jm \cdot Rm} Vin \quad (12)$$

Additionally, a necessary element for controlling the synchronizing mechanism 2 includes the armature current (Im) for detecting load applied to the electric motor 10 other than the position of the coupling sleeve 6 (Psc). Consequently, according to the above equations (4) and (11), an equation (13) as a model equation in relation to the armature current (Im) can be obtained as follows:

$$Im = \frac{Vm}{Rm} = \frac{Jm}{Km} \dot{\omega} = \frac{Jm}{Km \cdot Rsc} \ddot{Psc} \quad (13)$$

where Im is the armature current of the electric motor 10.

Accordingly, a model of a one-input two-output system which shows the applied voltage (Vin) to the electric motor 10 as input, and the actual position of the coupling sleeve 6 (Psc) and the armature current (Im) of the electric motor 10 as output can be given by the above equations (12) and (13).

Subsequently, the derivation of a model equation of a continuous time system at a time when the inertial system object 30 comes into contact with the elastic system object 31 to receive a reaction force from the elastic system object 31 (when the coupling sleeve 6 comes into contact with the synchronizer ring 8 to receive a reaction force from the synchronizer ring 8) is described.

A motion equation of the inertial system object 30 in FIG. 3 is given by the following equation (14):

$$Ms \cdot \dot{P}sc = -Ksc(Psc - Psc\_def) + Fsc \quad (14)$$

where Ms is equivalent inertia of the elastic system object 31, Psc_def is the standby position of the elastic system object 31, Ksc is the spring constant of the elastic system object 31, and Fsc is a force that the elastic system object 31 receives from the inertial system object 30 (a reaction force that the elastic system object 31 gives to the inertial system object 30).

When the above equation (14) is rearranged with regard to the reaction force (Fsc), an equation (15) is given as follows:

$$Fsc = Ms \cdot \dot{P}sc + Ksc(Psc - Psc\_def) \quad (15)$$

At this point, a reaction force (Fsc) will be a reaction force which the elastic system object 31 gives to the inertial system object 30, a motion equation of the inertial system object 30 when the reaction force (Fsc) is applied thereto is given by the following equation (16):

$$Jm \cdot \dot{\omega} = Tm - Rsc \cdot Fsc \quad (16)$$
$$= Km \cdot Im - Rsc \cdot Fsc$$
$$= Km \cdot Vm / Rm - Rsc \cdot Fsc$$

Change of this equation (16) will give the form of the following equation (17), and when the back electromotive force of the electric motor 10 is considered, a relationship between the applied voltage to the electric motor 10 (Vin) and the armature voltage (Vm) is given by the following equation (18):

$$Vm = \frac{Jm \cdot Rm}{Km}\dot{\omega} + \frac{Rsc \cdot Rm}{Km}Fsc \quad (17)$$

$$Vin = Km' \cdot \omega + Vm \quad (18)$$
$$= Km' \cdot \omega + \frac{Jm \cdot Rm}{Km}\dot{\omega} + \frac{Rsc \cdot Rm}{Km}Fsc$$

Additionally, substitution of the above equations (10) and (11) into the equation (18) will give the form of the following equation (19), and an equation (20) can be obtained by rearranging the equation (19) as follows:

$$Vin = Km' \cdot \dot{P}sc / Rsc + \frac{Jm \cdot Rm}{Km}\ddot{P}sc / Rsc + \frac{Rsc \cdot Rm}{Km}Fsc \quad (19)$$

$$\ddot{P}sc = \frac{-Km \cdot Km'}{Jm \cdot Rm}\dot{P}sc + \frac{Km \cdot Rsc}{Jm \cdot Rm}Vin - \frac{Rsc^2 \cdot Rm}{Jm \cdot Rm}Fsc \quad (20)$$

Furthermore, with regard to the armature current (Im) of the electric motor 10, the above equation (11) can be substituted into the above equation (16) to obtain the following equation (21):

$$Im = \frac{Jm}{Km \cdot Rsc}\dot{P}sc + \frac{Rsc}{Km}Fsc \quad (21)$$

Accordingly, the model in which the reaction force from the elastic system object 31 is considered is given by the above equations (20) and (21).

A model equation of a discrete-time system is then derived based on the model equation of the continuous time system given by the above equations (20) and (21).

First, when state variables ($x_1$, $x_2$) of the model of the continuous time system are set as the following equation (22), the model of the continuous time system can be given by the following equation (23) based on the above equation (20):

$$\begin{cases} x1 = PSc \\ x2 = \frac{dx_1}{dt} = \dot{P}sc, \frac{dx_2}{dt} = \ddot{P}sc \end{cases} \quad (22)$$

$$\begin{cases} \frac{dx_1}{dt} = x2 \\ \frac{dx_2}{dt} = \frac{-Km \cdot Km'}{Jm \cdot Rm}x2 + \frac{Km \cdot Rsc}{Jm \cdot Rm}Vin - \frac{Rsc^2}{Jm}Fsc \end{cases} \quad (23)$$

At this point, when a sampling period of the control apparatus 1 is set to be T, the above equation (23) is expressed by the form of the following equation (24) according to Euler's approximation, and equations (25) and (26) can be obtained by changing the equation (24) as follows:

$$\begin{cases} \frac{x_1(t) - x_1(t-T)}{T} = x2(t) \\ \frac{x_2(t) - x_1(t-T)}{T} = \frac{-Km \cdot Km'}{Jm \cdot Rm}x2(t-T) + \\ \quad \frac{Km \cdot Rsc}{Jm \cdot Rm}Vin(t-T) - \frac{Rsc^2}{Jm}Fsc \end{cases} \quad (24)$$

where t is a sampling time point, and T is the sampling period.

$$x_1(t) = x_1(t-T) + T \cdot x_2(t) \quad (25)$$

$$x_2(t) = \quad (26)$$
$$\left(1 - \frac{-Km \cdot Km'}{Jm \cdot Rm}T\right)x2(t-T) + \frac{Km \cdot Rsc}{Jm \cdot Rm}T \cdot Vin(t-T) - \frac{Rsc^2}{Jm}T \cdot Fsc$$

Furthermore, according to the Euler's approximation, $x_2(t-T)$ in the above equation (26) can be given by the following equation (27):

$$x2(t - 2T) = \frac{x_1(t-T) - x_1(t-2T)}{T} \quad (27)$$

When the above equations (26) and (27) are substituted into the above equation (25) to be rearranged, an equation (28) can be obtained as follows:

$$x_1(t) = \left(2 - \frac{Km \cdot Km'}{Jm \cdot Rm}T\right)x1(t-T) - \left(1 - \frac{Km \cdot Km'}{Jm \cdot Rm}T\right)x1(t-2T) + \quad (28)$$
$$\frac{Km \cdot Rsc}{Jm \cdot Rm}T^2 \cdot Vin(t-T) - \frac{Rsc^2}{Jm}T^2 \cdot Fsc$$

Rearrangement according to t=kT in the equation (28) will give the form of an equation (29), so that an equation (30) can be obtained as follows:

$$x_1(k) = \left(2 - \frac{Km \cdot Km'}{Jm \cdot Rm}T\right)x1(k-1) - \left(1 - \frac{Km \cdot Km'}{Jm \cdot Rm}T\right)x1(k-2) + \quad (29)$$
$$\frac{Km \cdot Rsc}{Jm \cdot Rm}T^2 \cdot Vin(k-1) - \frac{Rsc^2}{Jm}T^2 \cdot Fsc$$

$$x_1(k+1) = \left(2 - \frac{Km \cdot Km'}{Jm \cdot Rm}T\right)x1(k) - \quad (30)$$
$$\left(1 - \frac{Km \cdot Km'}{Jm \cdot Rm}T\right)x1(k-1) + \frac{Km \cdot Rsc}{Jm \cdot Rm}T^2 \cdot Vin(k) - \frac{Rsc^2}{Jm}T^2 \cdot Fsc$$

When coefficients in the above equation (30) are replaced as shown in the following equation (31), the equation (30) can be expressed by the form of an equation (32) as follows:

$$\begin{cases} x1 = Psc \\ a1 = 2 - \frac{Km \cdot Km'}{Jm \cdot Rm}T, \; a2 = -1 + \frac{Km \cdot Km'}{Jm \cdot Rm}T \\ b1 = \frac{Km \cdot Rsc}{Jm \cdot Rm}T^2 \\ d = \frac{Rsc^2}{Jm}T^2 \cdot Fsc \end{cases} \quad (31)$$

$$Psc(k+1) = a1 \cdot Psc(k) + a2 \cdot Psc(k-1) + b1 \cdot Vin(k) + d \quad (32)$$

Therefore, the control apparatus 1 is designed by a configuration shown in FIG. 4 based on a model equation of the following equation (33) with determining a disturbance term d as 0 in the model of the discrete-time system given by the above equation (32). The configuration of the control apparatus 1 shown in FIG. 4 is described below:

$$Psc(k+1) = a1 \cdot Psc(k) + a2 \cdot Psc(k-1) + b1 \cdot Vin(k) \quad (33)$$

First, a design procedure of a sliding mode controller 40 is described. In relation to the model expressed by the above equation (33), the sliding mode controller 40 allows the target position (Psc_cmd) to track the actual position (Psc) of the inertial system object 30 rapidly, and achieves compliance properties (rubber-like elasticity) when the inertial system object 30 and the elastic system object 31 make contact with each other.

The sliding mode controller 40 controls a behavior of the inertial system object 30 using a sliding mode control which is an example of a response specifying-type control. In the sliding mode controller 40, the actual position (Psc) of the inertial system object 30 calculated by the actual position ascertaining portion 21 based on the above equation (33), the target position (Psc_cmd) of the inertial system object 30 set by the target position setting portion 22, and a compliance parameter (VPOLE) to be hereinafter described are entered.

When a deviation (Esc) between the actual position (Psc) and the target position (Psc_cmd) of the inertial system object 30 is defined as shown in the following equation (34), a switching function (σ corresponding to a first linear function of the present invention) for specifying the degree of influence given to the deviation (Esc) from a convergence behavior and a disturbance of the deviation (Esc) is defined as an equation (35), because there are two state variables (Psc(k) and Psc(k−1)) of the equation (34), as follows:

$$Esc(k) = Psc(k) - Psc\_cmd(k) \quad (34)$$

$$\sigma(k) = Psc(k) + VPOLE \cdot Esc(k-1) \quad (35)$$

where VPOLE is the compliance parameter (switching function setting parameter).

The sliding mode controller 40 determines a control input to have this switching function (σ) to be σ(k)=0. In addition, the equation σ(k)=0 may be changed into a form of the following equation (36) based on the above equation (35):

$$Esc(k) = -VPOLE \cdot Esc(k-1) \quad (36)$$

At this point, the equation (36) denotes a primary delay system without an input, so that the sliding mode controller 40 executes a control that responses of a control system are gathered to the primary delay system of the above equation (36).

Accordingly, as shown in FIG. 5(a), when a phase plane is set with a vertical axis as Esc(k) and a horizontal axis as Esc(k−1), it can be seen that the above equation (36) indicates a proportionality function on the phase plane. In addition, the above equation (36) is indicative of the primary delay system without an input. Resultingly, when the compliance parameter (VPOLE, corresponding to a computation coefficient of the present invention) is set within a range of the following equation (37) to stabilize the primary delay system, the above equation (36) will indicate a system that the deviation (Esc) surely converges on 0 according to a passage of time (k→∞):

$$-1 < VPOLE < 1 \quad (37)$$

Accordingly, on the phase plane shown in FIG. 5(a), when a state amount of the deviations (Esc(k), Esc(k−1), corresponding to a first state amount of the present invention) is given on the switching function (σ(k)=0), the state amount is held to the primary delay system without an input. As a result, the state amount will automatically converge on an origin point on the phase plane {(Esc(k), Esc(k1))=(0, 0)} in conjunction with the passage of time.

Therefore, the sliding mode controller 40 uses such a behavior of the state amount (Esc(k), Esc(k−1)) on the switching function to determine the control input (Vin) to obtain σ=0 in the above equation (35) as shown in FIG. 5(a), so that the state amount is held on the switching function (σ(k)=0, corresponding to the first switching function) in order to have the state amount to converge on the origin point on the phase plane without suffering from influences of disturbance and errors due to modeling.

Further, a behavior until the state amount (Esc(k), Esc(k−1)) gradually approaches to the switching function (a process from $P_1$ to $P_2$ in FIG. 5(a)) is referred to as a reaching mode, and a behavior that the state amount automatically converges in a direction of the origin point on the switching function (a process from $P_2$ to $P_0$ in FIG. 5(a)) is referred to as a sliding mode.

Additionally, when the compliance parameter (VPOLE) in the above equation (36) is set at positive (0<VPOLE<1), the primary delay system given by the equation (36) will be a vibration stable form, so that it is undesirable in the control which makes the deviation (Esc) to converge. Therefore, a convergence response of the deviation (Esc) is set as shown in FIG. 5(b) by determining the compliance parameter (VPOLE) in the range of −1 to 0 (−1<VPOLE<0). In FIG. 5(b), a, b, c indicate transitions of the deviation (Esc) when the compliance parameter (VPOLE) is set at −1, −0.8, −0.5, respectively. Consequently, with setting as VPOLE=−1, the deviation (Esc) will be at a constant value without converging on 0.

Subsequently, dynamic characteristics of the above equation (36), i.e., response specifying characteristics of the sliding mode controller 40 are described. FIG. 6 is a graph showing a response of the control system when the compliance parameter (VPOLE) is set at −0.5, −0.8, −0.99, and −1.0 to give a step disturbance D in the state of σ=0 and Esc=0, vertical axes indicate a deviation (Esc), a switching function (σ), and a disturbance (D) from the top respectively, and horizontal axes indicate time (k).

As clearly shown in FIG. 6, there are characteristics indicating that, as an absolute value of the compliance parameter (VPOLE) decreases, an influence which the disturbance (D) gives to the deviation (Esc) decreases, and on the other hand, as the absolute value of the compliance parameter (VPOLE) increases to approach toward 1, the deviation (Esc) permitted by the sliding mode controller 40 increases. At this time, it is understood that regardless of the value of the compliance parameter (VPOLE), the switching function value (σ) has the same behavior, so that the allowable amount to the disturbance (D) can be set based on the compliance parameter (VPOLE).

When the inertial system object 30 and the elastic system object 31 make contact with each other as shown in FIG. 3, it is necessary that the inertial system object 30 is pressed against the elastic system object 31 while avoiding the states: 1. the inertial system object 30 is bounced back by the elastic system object 31, and 2. the inertial system object 30 is pushed into the elastic system object 31 by an excessive collision force.

Consequently, in view of the above-mentioned characteristics, when the inertial system object 30 and the elastic system object 31 make contact with each other, it is effective that the compliance parameter (VPOLE) is set close to −1 to increase the allowance of the deviation (Esc), and thereby generating resiliency by the actuation of the electric motor 10 when the inertial system object 30 and the elastic system object 31 make contact with each other.

Accordingly, the generation of an excessive impact may be controlled when the inertial system object 30 and the elastic system object 31 make contact with each other. In addition, the effect, which the inertial system object 30 can be pressed against the elastic system object 31, may be obtained without giving an excessive force to the elastic system object 31.

In view of applying this effect to an actual synchronizing mechanism 2 shown in FIG. 1, an impact generated when the coupling sleeve 6 makes contact with the synchronizer ring 8 may be lessened. In addition, the coupling sleeve 6 is pressed against the synchronizer ring 8 without giving an excessive force to the synchronizer ring 8, and thereby allowing the rotational speeds of the coupling sleeve 6 and the synchronized gear 7 to engage the coupling sleeve 6 with the synchronizer ring 8.

The control input (Vin) of the sliding mode controller 40 is set by the sum total of three control inputs, as shown in the following equation (38):

$$Vin(k)=Usl(k)=Ueq(k)+Urch(k)+Uadp(k) \quad (38)$$

where Vin(k) is the applied voltage to the electric motor 10 in the kth sampling period, Ueq(k) is an equivalent control input in the kth sampling period, Urch(k) is a reaching rule input in the kth controlling period, and Uadt(k) is an adapting rule input the kth sampling period.

Further, the equivalent control input means an input for holding the state amount of deviations (Esc(k), Esc(k−1) on a switching line (σ=0), the reaching rule input means an input for giving the state amount on the switching function, and the adapting rule input means an input for giving the state amount on the switching function by absorbing a modeling error and a disturbance.

Setting methods of the equivalent control input (Ueq(k)), the reaching rule input (Urch(k)), and the adapting rule input (Uadp(k)) are described below.

First, in a narrow sense, the equivalent control input (Ueq) has a function for holding the state amount of the deviation in any location on a phase plane to that particular location. Consequently, the equivalent control input (Ueq) is calculated as the applied voltage (Vin) satisfying the following equation (39):

$$\sigma(k+1)=\sigma(k) \quad (39)$$

When the above equations (35) and (34) are substituted into the equation (39), an equation (40) can be obtained as follows:

$$Psc(k+1)-Psc\_cmd(k+1)+VPOLE\{Psc(k)-Psc\_cmd(k)\}=Psc(k)-Psc\_cmd(k)+VPOLE\{Psc(k-1)-Psc\_cmd(k-1)\} \quad (40)$$

The above equation (33) is then substituted into the equation (40) to be rearranged, so that an equation (41) relating to the equivalent control input (Ueq) can be obtained as follows:

$$Ueq(k) = \quad (41)$$

$$Vin(k) = \frac{1}{b1}\{(1 - VPOLE - a1)Psc(k) + (VPOLE - a2)Psc(k-1)\} +$$

$$Psc\_cmd(k+1) + (VPOLE - 1)Psc\_cmd(k) -$$

$$VPOLE \cdot Psc\_cmd(k-1)$$

The reaching rule input (Urch) is then calculated by the following equation (42):

$$Urch(k) = \frac{-F}{b1}(|\sigma(k)| + \Delta)\mathrm{sign}(\sigma(k)) \quad (42)$$

where F is a reaching rule gain, and Δ is a switching amplitude (an absorption parameter of nonlinear characteristics such as a mechanical backlash and play).

In addition, when the switching amplitude (Δ) is determined at zero (Δ=0), the above equation (42) is given by the form of the following equation (43):

$$Urch(k) = \frac{-F}{b1}\sigma(k) \quad (43)$$

Additionally, the adapting rule input (Uadp) is calculated by the following equation (44):

$$Uadp(k) = \frac{-G}{b1} \cdot \sum_{i=0}^{k} \sigma(i) \quad (44)$$

where G is an adapting rule gain.

At this point, when the equivalent control input (Ueq(k)) of the above equation (41), the reaching rule input (Urch(k)) of the above equation (43) and the adapting rule input (Uadp(k)) of the above equation (44) are substituted into the above equation (38) to obtain a control input (Usl(k)), and the obtained control input (Usl(k)) is substituted into the above equation (33) as the applied voltage (Vin) to the electric motor 10, an equation (45) is obtained as follows:

$$\begin{aligned}Psc(k+1) &= a1\,Psc(k) + a2\,Psc(k-1) + b1\,Vin(k) \quad (45)\\ &= a1\,Psc(k) + a2\,Psc(k-1) +\\ &\quad b1(Ueq(k) + Urch(k) + Uadp(k))\\ &= a1\,Psc(k) + a2\,Psc(k-1) +\\ &\quad (1 - VPOLE - a1)\,Psc(k) +\\ &\quad (VPOLE - a2)Psc(k-1) +\\ &\quad Psc\_cmd(k+1) + (VPOLE - 1)Psc\_cmd(k) -\\ &\quad VPOLE\cdot Psc\_cmd(k-1) - F\sigma(k) - G\sum_{i=0}^{k}\sigma(i)\end{aligned}$$

When the above equations (34) and (35) are applied to the equation (45) to rearrange about σ, an equation (46) can be obtained as follows:

$$\sigma(k+1) = (1 - F)\sigma(k) - G\sum_{i=0}^{k}\sigma(i) \quad (46)$$

At this point, a role of the reaching rule input (Urch(k)) and the adapting rule input (Uadp(k)) is to move the state amount (Esc(k), Esc(k−1)) on the switching function (σ=0), i.e., a stabilization (σ→0) of the above equation (46). As a result, it is necessary to determine a reaching rule gain (F) and an adapting rule gain (G) to stabilize the equation (46).

Therefore, when Z-transformation is applied to the above equation (46), the following equation (47) is obtained, and consequently, the equation (47) is changed to obtain an equation (48) as follows:

$$Z\cdot\Sigma = (1 - F)\Sigma - G\frac{T}{Z-1}\Sigma \quad (47)$$

$$Z^2\cdot\Sigma + Z(F-2)\Sigma + (GT+1-F)\Sigma = 0 \quad (48)$$

In this case, a requirement to stabilize the above equation (48) is that coefficients of the second term and the third term (F−2, GT+1−F) on the left side will be a combination entered within a triangle area in FIG. 7. Consequently, values of F and G may be determined, so that these coefficients are entered within the triangle area. Further, the inside of the triangle area in FIG. 7 corresponds to the stabilizing requirement of the present invention.

The sliding mode controller 40 determines the above equation (43) according to the values of F, G determined in this way, and also determines the reaching rule input (Urch(k)) and the adapting rule input (Uadp(k)) according to the equation (44), respectively. In addition, the sliding mode controller 40 determines the equivalent control input (Ueq(k)) according to the above equation (41) to determine the applied voltage (Vin) to the electric motor 10 according to the above equation (38).

Referring to FIG. 1, in the actual synchronizing mechanism 2, the coupling sleeve 6 needs to be pressed against the synchronizer ring 8 with a constant force in order to synchronize the rotational speeds of the coupling sleeve 6 and the synchronized gear 7. Consequently, in the model shown in FIG. 3, after the inertial system object 30 and the elastic system object 31 make contact with each other, it will be necessary to have a configuration to control for applying a constant pressing force from the inertial system object 30 to the elastic system object 31.

At this time, the armature current (Im) of the electric motor 10 in the state that the inertial system object 30 and the elastic system object 31 make contact with each other is shown according to the above equation (21). However, while rotationally synchronizing, an acceleration of the inertial system object 30 is assumed to be zero (a second derivative of Psc is zero), and as a result, the above equation (21) is changed into a form of an equation (49) as follows:

$$Im = \frac{Rsc}{Km}Fsc \quad (49)$$

Further, the constant pressing force is a reaction force to a force that the inertial system object 30 receives from the elastic system object 31, so that in order to maintain the constant pressing force, a relationship of an equation (50) may be established as follows:

$$Im = m\_cmd \quad (50)$$

where Im_cmd is a target current value.

Further, the target current value (Im_cmd) corresponds to the target value of pressing force of the present invention, the electric current detecting portion 20 corresponds to pressing force ascertaining means of the present invention, and the armature current (Im) of the electric motor 10 detected by the electric current detecting portion 20 corresponds to the pressing force of the present invention.

Additionally, the above equation (50) is applied with discrete-time, so that an equation (51) for calculating a deviation (Eim) between the actual armature current (Im) and the target current value (Im_cmd) can be obtained as follows:

$$Eim(k) = Im(k) - Im\_I\_cmd = 0 \quad (51)$$

At this point, as can be seen in the above equations (20) and (21), the synchronizing mechanism 2 is shown as a model of the one-input two-output system determining the applied voltage (Vin) to the electric motor 10 as an input and the position of the inertial system object 30 (Psc) and the armature current (Im) of the electric motor 10 as an output.

However, until the inertial system object 30 and the elastic system object 31 make contact with each other, a control of the position (Psc) of the inertial system object 30 may only be performed. Consequently, the control by the sliding mode controller 40 may be performed in a manner that the synchronizing mechanism 2 is shown as a model of a one-input one-output system having the applied voltage (Vin) to the electric motor 10 as an input and the armature current (Im) of the electric motor 10 as an output.

accordingly, to perform a feedback control of the armature current (Im) of the electric motor 10, the sliding mode controller 40 needs to be switched from one aimed for the one-input one-output system model to one aimed for the one-input two-output system model. However, when the sliding mode controller 40 is switched in this way, discontinuity of input (Vin) is generated, and as a result, it is difficult to stabilize a controlled state when the sliding mode controller 40 is switched.

Therefore, as will be described below, a voltage determining portion 24 does not switch the sliding mode controller 40, but controls the compliance parameter (VPOLE) for setting a compliance characteristic of the sliding mode controller 40 based on a feedback of the armature current (Im) of the electric motor 10, and thereby stabilizing the pressing force from the inertial system object 30 to the elastic system object 31.

First, considering: 1. fast responding property to the target current (Im_cmd) of the armature current (Im), and 2. stability of the armature current (Im) proportional to the pressing force, the feedback control of the armature current (Im) is performed by using a simplified sliding mode control according to the following equations (52) to (57):

$$E\_Im(k)=Im\_cmd-Im(k) \tag{52}$$

$$\sigma\_Im(k)=E\_Im(k)+POIE\_Im \cdot E\_Im(k-1) \tag{53}$$

$$Urch\_Im(k)=F\_Im \cdot \sigma\_Im(k) \tag{54}$$

$$Uadp\_Im(k) = G\_Im \cdot \sum_{i=0}^{k} \sigma\_Im(i) \tag{55}$$

$$VPOLE\_Im(k)=VPOLE\_bs+Urch\_Im(k)+Uadp\_Im(k) \tag{56}$$

$$VPOLE(k)=\text{Limit}(VPOLE\_Im(k)) \tag{57}$$

where Limit is limiting processing of −1 to 0, F_Im is the reaching rule gain, G_Im is the adapting rule gain, POLE_Im is the switching function setting parameter, VPOLE_bs is a reference value of VPOLE, Urch_Im is the reaching rule input, and Uadp_Im is the adapting rule input.

A control block diagram of a current feedback system is shown as FIG. 8. In the control block diagram, instead of using the sliding mode controller aimed for controlling the one-input two-output system model, a double feedback system is provided with a current feedback portion 50 for controlling the armature current (Im) on the outside of the sliding mode controller 40 aimed for controlling the one-input one-output system model.

Furthermore, the current feedback portion 50 is included in a voltage calculating portion 41 shown in FIG. 4. A subtracter 51 calculates a current deviation (E_Im, corresponding to the second state amount) according to the above equation (52), a switching function calculating portion 52 calculates a value of the switching function ($\sigma$_Im, corresponding to a second linear function of the present invention) according to the above equation (53), a proportion computing unit 53 calculates a reaching rule input (Urch_Im) according to the above equation (54), and an integrator 55 and an integral multiplier 56 calculates an adapting rule input (Uadp_Im) according to the above equation (55).

Additionally, an adder 57 and an adder 58 calculate a compliance parameter (VPOLE_Im) reflected from the electric current feedback according to the above equation (56), so that a limiter 59 determines the compliance parameter (VPOLE) to the sliding mode controller 40 by performing the limiting processing according to the above equation (57).

Further, the switching function which the switching function of the above equation (55) is adapted to be 0 ($\sigma$_Im(k)=0) corresponds to a second switching function of the present invention, and the compliance parameter (VPOLE_Im) calculated according to the equation (56) corresponds to a second operation amount of the present invention.

A compliance parameter calculating portion 41 shown in FIG. 4 then sets the compliance parameter (VPOLE) which sets the compliance characteristic of the sliding mode controller 40 for controlling an operation of the synchronizing mechanism 2, by dividing into the following three steps.

Step 1 (corresponding to a contacting process of the present invention): Target value tracking control—A control of a position of the inertial system object 30 (Psc), and a control of the compliance characteristic when the inertial system object 30 and the elastic system object 31 make contact with each other. The compliance parameter (VPOLE) is determined depending on the position of the inertial system object 30 (Psc).

Step 2: Rotational synchronization control—A control of the pressing force to the elastic system object 31. The compliance parameter (VPOLE) is determined according to the above-mentioned feedback of the armature current of the electric motor 10.

Step 3: Stationary control—A control for stopping a forward movement of the inertial system object 30 after the rotational synchronization (after completing to engage the coupling sleeve 6 and the synchronized gear 7 together in the synchronizing mechanism 2). The compliance parameter (VPOLE) is kept constant.

The compliance parameter calculating portion 41 needs to switch the processes with stability, even if variations and changes of a switching position from step 1 to step 2 and a switching timing from step 2 to step 3 are generated due to mechanical variations and secular changes of the synchronizing mechanism 2. A method for determining the switching timing of the process is described below.

The upper graph in FIG. 9 shows a change of a deviation (Esc=Psc−Psc_cmd) between the actual position (Psc) and the target position (Psc_cmd) of the inertial system object 30 during switching of the process. A vertical axis is set for the actual position (Psc) of the inertial system object 30 and the target position (Psc_cmd), and a horizontal axis is set for time (t). As can be seen in the graph, when each step is switched, the deviation (Esc) is changed as follows.

When switching from step 1 to step 2: A movement of the inertial system object 30 is controlled by contacting the elastic system object 31, and thereby causing a state that the actual position (Psc) is delayed to the target position (Psc_cmd) so as to increase the deviation in a negative direction.

When switching from step 2 to step 3: When the rotational synchronization of the elastic system object 31 and the inertial system object 30 is completed, and the position of the inertial system object 30 (Psc) reaches the target position (Psc_cmd), the deviation (Esc) decreases in a positive direction.

Therefore, each step is switched by detecting changes of such deviations (Esc), and as shown in the lower graph in FIG. 9, a value of the compliance parameter (VPOLE, f in FIG. 9) may be set depending on each step.

However, the actual synchronizing mechanism 2 shown in FIG. 1 is designed for a large control with a mechanical backlash and play, and friction. Consequently, controllability increases by shortening the sampling period of the control apparatus 1. However, a SN ratio decreases when the deviation (Esc) is calculated by setting the sampling period short, and as a result, it will be difficult to detect the change of the deviation (Esc). Therefore, as described below, a wavelet transformation filter 43 (see FIG. 4) provided in a Vin determining portion 24 applies a wavelet transformation to the deviation (Esc) to extract only a low frequency element of the deviation (Esc), and thereby detecting the change of the deviation (Esc) easily.

A filter using a wavelet transformation (hereinafter referred to as a wavelet transformation filter) has a configuration shown in FIG. 10(a), and performs filtering by repeating half band low-pass filter processing and decimation processing twice according to the following equation (58):

$$Gl(\eta)=0.7071 \times u(\eta)+0.7071 \times u(f-1) \qquad (58)$$

where u is input data, and η is a time series number of the sampling period.

A half band low-pass filter 70 of the first stage shown in FIG. 10(*a*) performs the processings of the above equation (57) to a sampling period input value (Esc((k)) of the present time and a sampling period input value (Esc((k−1)) of the last time. In addition, a half band low-pass filter 71 of the second stage performs the processings of the above equation (58) to the present time value and the last time value (Esc_wv₁(m₁) and Esc_wv₁(m₁−1)) of Esc_wv₁(m₁) in which decimation processing 72 is applied to output of the half band low-pass filter 70 of the first stage.

As shown in FIG. 10(*b*), the half band low-pass filters 70, 71 stop frequency elements having more than half of the sampling frequencies (Nyquist frequency), so that a gain of low frequency elements is higher than 1, and as a result, an effect for amplifying a gain to the low frequency elements may be obtained.

Additionally, the decimation processings 72, 73(2↓) in FIG. 10(*a*) are downsampling processing, and as shown in FIG. 11(*a*), the downsampling processing that input data (u) is altetnately sampled is executed.

The wavelet transformation filter 43 extracts the low frequency elements (Esc_wv), while amplifying the gain as shown in a graph of the FIG. 11(*b*) by repeatedly applying the half band low-pass filter 70, 71 processing and the decimation processings 72, 72. Further, the vertical axis and the horizontal axis of the graph shown in FIG. 11(*b*) are set for a gain, and a frequency, respectively.

Accordingly, high frequency elements of an input signal (Esc) are eliminated and a gain to the input signal (Esc) is amplified, so that a change of low frequency elements of the input signal (Esc) may be extracted by improving the SN ratio.

Furthermore, the VPOLE calculating portion 41 switches each step by using ΔEsc_wv(=Esc_wv(m)−Esc_wv(m−1)) which is a change amount of a wavelet transformation value (Esc_wv) of the deviation (Esc), as follows:

Switch from step 1 to step 2: Psc>Psc_def and Esc_wv>X_SCCNT; and

Switch from step 2 to step 3: Psc>Psc_def and ΔEsc_wv>X_SCDONE, where Psc_def is a VPOLE variable starting position in step 1, X_SCCNT is a contact judgment threshold of Esc_wv, and X_SCDONE is a rotational synchronization completion judgment threshold.

Further, Esc_wv and ΔEsc_wv in the above-mentioned switching requirement correspond to a degree of deviation of the actual position to the target position of the present invention, X_SCCNT corresponds to a first predetermined level of the present invention, and X_SCDONE corresponds to a second predetermined level of the present invention.

A procedure for controlling an operation of a synchronizing mechanism 7 by the control apparatus 1 configured by the above-described technique is described according to a flowchart shown in FIG. 12. The control apparatus 1 receives a signal instructing a gear change of a transmission from a main controller of an automobile (not shown) to go to STEP 1 from STEP 2.

The control apparatus 1 sets a moving pattern of the coupling sleeve 6 as a target position (Psc_cmd) by the target position setting portion 22, shown in FIG. 13(*a*), depending on shifting positions (first-speed, second-speed, . . . , neutral) selected by the main controller. In addition, the control apparatus 1 sets a change position (Psc_vp) of the compliance parameter (VPOLE) and a standby position (Psc_def) of the synchronizer ring 8 in step 1.

In subsequent STEP 3, the control apparatus 1 calculates a deviation (Esc) between the actual position (Psc) of the coupling sleeve 6 calculated according to the above equation (33) by the actual position ascertaining portion 21 and the target position (Psc_cmd). Further, k in FIG. 12 indicates the kth sampling period, Psc(k) and Psc_cmd(k) indicate an actual position and a target position of the coupling sleeve 6 in the kth sampling period, respectively.

In next STEP 4, the control apparatus 1 executes the aforementioned processing by the wavelet transformation filter 43 to calculate the wavelet transformation value (Esc_wv) of the deviation (Esc). Furthermore, Esc_wv(m) in FIG. 12 indicates the wavelet transformation value calculated based on the deviation (Esc(k)) in the kth sampling period as shown in FIG. 10(*a*).

Next STEP 5 to STEP 7 indicate a processing to determine a timing of switching the each above-mentioned step (step 1, step 2, and step 3), so that STEP 5 and STEP 6 set a switching requirement from step 1 to step 2, and STEP 7 sets a switching requirement from step 2 to step 3.

First, in STEP 5, the actual position (Psc(k)) of the coupling sleeve 6 is branched to STEP 20 until passing through the standby position (Psc_def) of the synchronizer ring 8, and according to the setting table of the compliance parameter (VPOLE) shown in FIG. 13(*b*), the compliance parameter calculating portion 41 sets the compliance parameter (VPOLE) close to 0 (for example, −0.2). Further, a setting table shown in FIG. 13(*b*) is set with a vertical axis for the compliance parameter (VPOLE) and a horizontal axis for the actual position (Pse) of the coupling sleeve 6.

Accordingly, compliance characteristics of the synchronizing mechanism 2 decreases after the coupling sleeve 6 starts moving and until it reaches the change position (Psc_vp) of the compliance parameter (VPOLE), so that effects from a disturbance may be controlled to stably move the coupling sleeve 6.

Additionally, when the coupling sleeve 6 passes through the change position (Psc_vp) of the compliance parameter (VPOLE), the compliance parameter calculating portion 41 reduces the compliance parameter (VPOLE) close to −1 (for example, −0.99). As just described, immediately before the coupling sleeve 6 and the synchronizer ring 8 actually make contact with each other, the value of the compliance parameter (VPOLE) is reduced in advance to improve the compliance characteristics of the synchronizing mechanism 2, so that impacts generated at the time that the coupling sleeve 6 and the synchronizer ring 8 make contact with each other can be lessened.

In next STEP 6, when Esc_wv(m)>X_SCCNT, which is the switching requirement from step 1 to step 2, is established, in other words, when the contact between the coupling sleeve 6 and the synchronizer ring 8 is detected, the procedure is proceeded to STEP 7. In STEP 7, when ΔEsc_wv(m)>X_SCDONE which is the aforementioned switching requirement from step 2 to step 3, in other words, when the rotational synchronization between the coupling sleeve 6 and the synchronizer ring 8 is arranged, so that the coupling sleeve 6 passes through the synchronizer ring 8 to be engaged with the synchronized gear 7, the procedure is branched to STEP 30.

On the other hand, in STEP 7, when ΔEsc_wv(m)>X_SCDONE is not established, the procedure is proceeded to STEP 8. The VPOLE calculating portion 41 executes the aforementioned calculation processing of the compliance parameter (VPOLE) according to the current feedback. The voltage determining portion 24 then calculates an applied voltage (Vin) to the electric motor 10 by the sliding mode controller 40 using the compliance parameter (VPOLE) calculated in this manner, and thereby applying this applied voltage (Vin) to the electric motor 10.

As just described, in step 2, the feedback processing of the armature current (Im) of the electric motor 10 maintains the armature current (Im) of the electric motor 10 at the target current (Im_cmd) to control the output torque of the electric motor 10 to be constant, so that the pressing force of the coupling sleeve 6 to the synchronizer ring 8 can be stabilized.

Accordingly, the coupling sleeve 6 is prevented from being pushed against the synchronizer ring 8 with an excessive force, and thereby a damage of the synchronizing mechanism 2 is prevented from generating.

Additionally, in step 3, the compliance parameter calculating portion 41 sets a compliance parameter (VPOLE) at a constant value (X_VPOLE_END) in STEP 30. The voltage determining portion 24 then calculates an applied voltage (Vin) to the electric motor 10 by the sliding mode controller 40 using the compliance parameter (VPOLE=X_VPOLE_END), so that the shift processing is completed by applying the applied voltage (Vin) to the electric motor 10.

Accordingly, even after completing the engagement between the coupling sleeve 6 and the synchronized gear 7, the coupling sleeve 6 is prevented from being pressed against the synchronized gear 7 with an excessive force, and as a result, damages of the synchronizing mechanism 2 may be prevented.

Further, as shown in FIG. 1, the embodiment of the present invention focuses on the synchronizing mechanism 2 with the coupling sleeve 6 provided on the side of the input shaft 5 and the synchronized gear 7 connected to the driving shaft. However, the present invention may be applied to a synchronizing mechanism with a coupling sleeve provided on the side of an output shaft and a synchronized gear connected to an input shaft.

Additionally, in the embodiment of the present invention, the voltage determining portion 24 uses the adapting sliding mode control having an adapting rule input with consideration of influences such as disturbances, but a common sliding mode control with the adapting rule input omitted may be used, and the other kind of response specifying-type controls such as a back-stepping control may also be used. In addition, the voltage determining portion 24 uses the sliding mode control to perform the electric current feedback processing, but when the electric current feedback processing is performed without using the sliding mode control, the advantage of the present invention may also be obtained.

In addition, in the embodiment of the present invention, the actual position ascertaining portion 21 ascertains the actual position (Psc) of the coupling sleeve 6 based on the model shown in FIG. 3. However, a position sensor may be provided, and the actual position (Psc) of the coupling sleeve 6 may directly be ascertained, according to a position detection signal of the position sensor and a lever ratio between the motor 10 and the coupling sleeve 6.

Moreover, in the present embodiment, an example applied with the present invention to the synchronizing mechanism 2 provided in a transmission of an automobile has been illustrated, but an applicable object of the present invention is not limited to the embodiment herein. For example, FIG. 14 shows an example applied with the present invention that a machine tool for boring by a end mill 81 to a workpiece 80 is modeled with an inertia system object on the side of the end mill 81 and an elastic system object on the side of the workpiece 80. Further, the end mill 81 is installed to a vertical movement actuator 83 by a chuck 82.

As shown in FIG. 14, just as described for the control to the synchronizing mechanism 2, a process for boring is divided into the following three processes.

Step 1: A tip of the end mill 81 is moved to the workpiece 80 in a short time until the end mill 81 comes into contact with the workpiece 80, and an impact at the time of the contact between the end mill 81 and workpiece 80 is controlled.

Step 2: The workpiece 80 is machined while applying a constant pressing force (Fc) to the end mill 81.

Step 3: The end mill 81 is stopped from moving downward in order to prevent the chuck 82 from colliding against the workpiece 80, because the end mill 81 rapidly moves down when the boring process of the workpiece 80 is completed and a drag is lost.

An actual position (Py) of the end mill 81 is then replaced with the actual position (Psc) of the coupling sleeve 6 in the synchronizing mechanism 2 shown in FIG. 2. A changed position of the compliance parameter (VPOLE) in step 1 (Py_vp, corresponding to Psc_vp in the control of the synchronizing mechanism 2) and a standby position (Py_def, corresponding to Psc_def in the control of the synchronizing mechanism 2) of the workpiece 80 are set, and thereby controlling an operation of the vertical movement actuator 83. Consequently, boring time can be shortened and the impact at the time of the contact between the end mill 81 and the workpiece 80 can be lessened, and an excessive pressing force applied to the workpiece 80 while machining may also be prevented.

Further, in the present embodiment, the example using the electric motor 10 as an actuator according to the present invention has been illustrated, but the present invention may also be applied to the other kinds of electric actuators as well as pneumatic and hydraulic actuators.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A control apparatus for executing a contacting process wherein a contact body is moved to come into contact with a contacted body by an actuator from a state that the contact body and the contacted body are spaced and opposed each other, by controlling an operation of a contact mechanism including the contact body movably provided in one axial direction, the actuator for moving the contact body connected therewith, and the contacted body making contact with the contact body when the contact body is moved to a predetermined position, comprising:

target position setting means for setting a target position of the contact body in the contacting process;

actual position ascertaining means for ascertaining an actual position of the contact body; and operation amount determining means for determining a first operation amount to drive the actuator so as to have a first state amount converge on an equilibrium point on a first switching function stipulated by a first linear function having at least a deviation between the target position and the actual position of the contact body as the first state amount and this first state amount as a variable by using response specifying-type control which can variably specify a damping behavior and a damping speed of the deviation in order to have the target position and the actual position of the contact body to match.

2. The control apparatus of the contact mechanism according to claim 1, wherein the operation amount determining means sets a computation coefficient of the first linear function depending on a actual position of a first engaging member.

3. The control apparatus of the contact mechanism according to claim 2, wherein in the contacting process, the operation amount determining means sets the computation coefficient in a direction that the control ability against a disturbance decreases, when the first engaging member is moved to a position where a distance between the first engaging member and the synchronizing member is less than a predetermined distance.

4. The control apparatus of the contact mechanism according to any one of claims 1 to 3, wherein the contact mechanism comprises a synchronizing mechanism for switching between transmission and cutoff of power;

the contact body comprises a first engaging member which is connected to an input shaft connected to a driving source or an output shaft connected to a driving wheel;

the contacted body comprises a synchronizing member which is provided rotatably to the first engaging member and a second engaging member and movably in the one direction between the first engaging member and the second engaging member connected to the shaft, either of the input shaft or the output shaft, to which the first engaging member is not connected, and makes contact with the first engaging member when the first engaging member is moved to a predetermined position, so that rotational speeds of the first engaging member and the second engaging member are synchronized in a state that the input shaft is rotated and thereby enabling the first engaging member and the second engaging member to be engaged with each other;

and the contacting process comprises:

a first step in which the first engaging member is moved toward the second engaging member by the actuator to make the first engaging member to come into contact with the synchronizing member; and a second step in which, subsequent to the first step, the first engaging member is pressed against the synchronizing member by the actuator, and thereby synchronizing the rotational speeds of the first engaging member and the second engaging member through the synchronizing member to engage the first engaging member and the second engaging member each other.

5. The control apparatus of the contact mechanism according to claim 4, wherein the operation amount determining means starts a processing in response to the second step when a degree of separation of the actual position of the first engaging member to the target position increases higher than a first predetermined level in the first step.

6. The control apparatus of the contact mechanism according to claim 5, wherein the operation amount determining member has pressing force ascertaining means for ascertaining a pressing force to the synchronizing member caused by the first engaging member, and the computation coefficient of the first linear function is set so as to match the pressing force determined by the pressing force ascertaining means with a predetermined target pressing force in the second step.

7. The control apparatus of the contact mechanism according to claim 6, wherein the operation amount determining means determines the first operation amount to stop the first engaging member from moving, when the degree of separation of the actual position of the first engaging member to the target position decreases more than the second predetermined level in the second step.

8. The control apparatus of the contact mechanism according to claim 7, wherein the operation amount determining means sets the computation coefficient in the direction that the control ability against the disturbance increases, when the degree of separation of the actual position of the first engaging member to the target position decreases more than the predetermined level in the second step.

9. The control apparatus of the contact mechanism according to claim 8, wherein the operation amount determining means ascertains the degree of the separation of the actual position of the first engaging member to the target position based on a transformation value with which filtering using a wavelet transformation is applied to time series data of a deviation between the actual position of the first engaging member and the target position.

10. The control apparatus of the contact mechanism according to claim 6, wherein the operation amount determining means sets the computation coefficient so as to have a second state amount converge on an equilibrium point on a second switching function stipulated by a second linear function having at least the deviation as the second state amount, the computation coefficient as a second operation amount, and the second state amount as a variable, by using the response specifying-type control which can variably specify a damping behavior and a damping speed of the deviation between the target pressing force and the pressing force determined by the pressing force ascertaining means to have the target pressing force and the pressing force ascertained by the pressing force ascertaining means to match in the second step.

11. The control apparatus of the contact mechanism according to claim 10, wherein the actuator is an electric actuator in which an output changes depending on an value of an electric current to be supplied, the first operation amount is an electric voltage supplied to the electric actuator, and the pressing force ascertaining means detects the electric current supplied to the electric actuator to ascertain a pressing force to the synchronizing member caused by the first engaging member based on the value of the supplied electric current.

12. The control apparatus of the contact mechanism according to claim 10, wherein the operation amount determining means uses adapting sliding mode control as the response specifying-type control based on the first switching function.

13. The control apparatus of the contact mechanism according to claim 12, wherein the operation amount determining means calculates the first operation amount according to a sum of an equivalent control input calculated by using a value of the first linear function, a reaching rule input, and an adapting rule input, so that a gain of the reaching rule input and a gain of the adapting rule input are set at values satisfying a stability condition that the first state amount converges on the first switching function.

14. The control apparatus of the contact mechanism according to claim 10, wherein the operation amount determining means uses a control for calculating a control input depending on the value of integration of the first switching function as the response specifying-type control based on the first switching function.

15. The control apparatus of the contact mechanism according to claim 14, wherein the operation amount determining means calculates the first operation amount according to a sum of a proportional term of the equivalent control input calculated by using the first linear function and the first switching function and an integral term of the first switching function, and thereby setting a gain of the proportional term of the first switching function and a gain of the integral term of the first switching function at the values satisfying the stability condition that the first state amount converges on the first switching function.

* * * * *